US006415329B1

(12) United States Patent
Gelman et al.

(10) Patent No.: US 6,415,329 B1
(45) Date of Patent: Jul. 2, 2002

(54) METHOD AND APPARATUS FOR IMPROVING EFFICIENCY OF TCP/IP PROTOCOL OVER HIGH DELAY-BANDWIDTH NETWORK

(75) Inventors: Jay R. Gelman, Crofton, MD (US); J. Scott Stadler, Tyngsboro, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/183,624

(22) Filed: Oct. 30, 1998

Related U.S. Application Data
(60) Provisional application No. 60/077,064, filed on Mar. 6, 1998.

(51) Int. Cl.[7] .......................... G06F 15/16; H04L 12/28

(52) U.S. Cl. ...................................... 709/245; 370/401

(58) Field of Search .............................. 709/217, 223, 709/227, 238, 245, 247, 239, 230, 401, 464, 409, 913; 370/401, 464, 409, 913

(56) References Cited

U.S. PATENT DOCUMENTS

| | | | | |
|---|---|---|---|---|
| 4,491,947 A | * | 1/1985 | Frank ........................... | 370/94 |
| 4,677,588 A | * | 6/1987 | Benjamin et al. ............ | 364/900 |
| 5,159,592 A | * | 10/1992 | Perkins ....................... | 370/85.7 |
| 5,224,098 A | * | 6/1993 | Bird et al. .................. | 370/94.1 |
| 5,423,002 A | * | 6/1995 | Hart ............................ | 709/249 |
| 5,442,633 A | * | 8/1995 | Perkins et al. .............. | 370/94.1 |
| 5,537,412 A | * | 7/1996 | Sima et al. ................. | 370/85.13 |
| 5,572,530 A | * | 11/1996 | Chitre et al. ............... | 370/110.1 |
| 5,623,601 A | | 4/1997 | Vu .......................... | 395/187.01 |
| 5,640,386 A | * | 6/1997 | Wiedeman ................... | 370/320 |
| 5,673,322 A | | 9/1997 | Pepe et al. ................... | 380/49 |
| 5,852,721 A | * | 12/1998 | Dillon et al. ............... | 709/217 |

(List continued on next page.)

OTHER PUBLICATIONS

Brown et al., "A network architecture for mobile computing", IEEE, 1996, pp. 1388–1396 (9).*

(List continued on next page.)

Primary Examiner—Robert B. Harrell
Assistant Examiner—Bunjob Jaroenchonwanit
(74) Attorney, Agent, or Firm—Hamilton, Brook, Smith & Reynolds, P.C.

(57) ABSTRACT

A method of communicating over a satellite or other high delay-bandwidth link comprises receiving, at a source or client gateway, incoming packets directed to a destination address, in a first protocol, preferably transmission control protocol (TCP) over Internet protocol (IP), or TCP/IP. The destination address is modified by replacing the destination address in a received packet with an address of the source gateway application so that the packets are forwarded to the source gateway application. Packets are forwarded from the source gateway application in a second protocol over the link to a destination gateway application. The original destination address is restored at the destination gateway application and the packets are forwarded to the destination address in the first protocol. Packets may be transmitted or forwarded over the link by first fragmenting them into smaller packets, and are reconstructed at the other end of the link. Preferably, in the second protocol, upon an automatic repeat request (ARQ) from the destination gateway application, only packets which are incorrectly received by the destination gateway application are retransmitted from the source gateway application. The packets may arrive at the destination gateway application in scrambled order, and thus are reordered, in the destination gateway application, into their original order. To reduce acknowledgment traffic, acknowledgments are sent over the high delay-bandwidth link only periodically. Only a list containing the first sequence number and the last sequence number of a series of contiguously received packets is sent back to the source gateway application.

66 Claims, 11 Drawing Sheets

U.S. PATENT DOCUMENTS 5,883,661 A * 3/1999 Hoarty ........................... 348/7
6,092,191 A * 7/2000 Shimbo et al. ............. 713/153
6,101,189 A * 8/2000 Tsuruoka .................... 370/401
6,115,384 A * 9/2000 Parzych ...................... 370/401
6,157,950 A * 12/2000 Krishnan .................... 709/223
6,198,728 B1 * 3/2001 Hulyakar et al. ........... 370/252
6,215,776 B1 * 4/2001 Chao .......................... 370/316
6,249,523 B1 * 6/2001 Hrastar et al. ............. 370/401
6,259,701 B1 * 7/2001 Shur et al. .................. 370/401

OTHER PUBLICATIONS

Goel et al., "Improving TCP performance over, wireless links", IEEE, 1998, pp. 332–335 (4).*

Henderson et al., "Satellite transport protocol (STP) an SSCOP–based transport protocol for datagram satellite networks", Universit of California at Bereley, Oct. 1997, pp. 1–12 (12).*

Fullmer et al., "Wireless internet gateways (WINGS)", IEEE, 1997, pp. 1271–1276 (6).*

Fieger et al., "Migration support for indirect transport protocols", IEEE, 1997, pp. 898–902 (5).*

Henderson et al., "On improving the fairness of TCP congestion avoidance", IEEE, 1998, pp. 539–544 (6).*

Henderson et al., "Henderson et al., "Satellite transport protocol (STP)"an SSCOP–based transport protocol for datagram satellite networks" presentation, WOSBIS'97 Universtiy of Californiaat Bereley, Oct. 1997, pp. 1–25 (25.*

Henderson et al. "Networking over next–generation satellites", Huges Research laps, Jun. 1997, pp. 21.*

Yavatkar, R. and Bhagawat, N., "Improving End–to–End Performance of TCP over Mobile Internetworks," IEEE Proceedings Workshop on Mobile Computing Systems and Applications, pp. 146–152, Santa Cruz, CA, Dec. 8–9, 1994.

Balakrishnan, H., et al., "A Comparison of Mechanisms for Improving TCP Performance over Wireless Links," *IEEE/ACM Transactions on Networking*, vol. 5, No. 6, pp. 756–769, Dec. 1997.

Patridge, C. and Shepard, T. J., "TCP/IP Performance over Satellite Links," *IEEE Network Magazine*, NASA Lewis Research Center, consisting of 7 pages, Sep./Oct. 1997.

Arora V., et al., "Asymmetric Internet Access over Satellite–Terrestrial Networks," A Collection of Technical Papers, Part 1, AIAA 16th International Communications Satellite Systems Conference, pp. 476–482, Feb. 25–29, 1996, Washington, D.C.

Balakrishnan, H., et al., "Improving TCP/IP Performance over Wireless Networks," *Mobicom 95*, pp. 2–11, Berkeley CA 1995.

Yeom, H.Y., et al., "IP Multiplexing by Transparent Port–Address Translator," *Lisa X*—pp. 113–121, Sep. 29—Oct. 4, 1996—Chicago, IL.

Spracklen, C.T., "Digital Communications Protocols in the Satellite Environment," The Institution of Electrical Engineers, *IEE Colloquium on Integration of Satellite and Terrestrial PCS*, pp. 4/1–4/7, Savoy Place, London, Apr. 1997.

Satellite Networks: Architectures, Applications, and Technologies Workshop, "Abstracts Package," Sponsored by Space Communications Program NASA Lewis Research Center, pp. 1–49, Jun. 2–4, 1998.

Terada, M. and Murayama, Y., "User Access DomAin Management System–Adams," pp. 50–61.

Bakre, A. and Badrinath, B.R., "I–TCP: Indirect TCP for Mobile Hosts," in Proceedings of 15th International Conference on Distributed Computing Systems, pp. 136–143, May 30–Jun. 2, 1995, Vancouver, Canada.

Henderson, T.R. and Katz, R. H., "Transport Protocols for Internet–Compatible Satellite Networks," *IEEE Journal on Selected Areas of Communications Submission*, pp. 1–16.

Kojo, M., et al., "Connecting Mobile Workstations to the Internet over a Digital Cellular Telephone Network," University of Helsinki, Department of Computer Science, Series of Publications C, No. C–1994–39 consisting of 20 pages.

Liljeberg, M., et al., "Optimizing World–Wide Web for Weakly Connected Mobile Workstations: An Indirect Approach," in Proceedings or SDNE 1995, pp. 1–8, (Jun. 5–6 Whisler, Canada).

Kojo, M., et al., "An Efficient Transport Service for Slow Wireless Telephone Links," *IEEE Journal on Selected Areas in Communications*, vol. 15, No. 7, pp. 1337–1348, Sep. 1997.

Hild, S.G. and Robinson, P., "Mobilizing Applications," *IEEE Personal Communications*, vol. 4, No. 5, pp. 26–34, Oct. 1997.

van Thanh, D. and Audested, J.A., "Mobility Support; a Multi–Domain Bridging Matter," Proceedings First International Enterprise Distributed Object Computing Workshop, IEEE communications Society, pp. 348–353, Oct. 24–26, 1997, Gold Coast, Australia.

Giovanardi, A. and Mazzini, G., "Transparent Mobile IP: an Approach and Implementation," IEEE Global Telecommunications Conference, pp. 1861–1965 Nov. 3–8, 1997, Phoenix, Arizona.

Sepmeier, B., "Worldwide TCP/IP Using Satellites—The Great Debate," NSN Network Services, pp. 1–4, Avon, CO.

Maltz, D.A. and Bhagwat, P., "MSOCKS: An Architecture for Transport Layer Mobility," Proceedings IEEE Infocom 1998, The Conference on Computer Communications, 17th Annual Joint Conference of the IEEE Computer and Communications Societies, vol. 3, pp. 1037–1045, Mar. 29–Apr. 2, 1998, San Francisco, CA.

Allman, M. and Glover, D., "Enhancing TCP Over Satellite Channels Using Standard Mechanisms," Internet Engineering Task Force, Internet–Draft of the Internet Engineering Task Force (IETF), pp. 1–11.

Egevang, K. and Francis, P., "The IP Network Address Translator (NAT)," Network Working Group, pp. 1–10.

E–mail Discussion from the TCP–SAT mailing list dated Apr. 14, 1997, consisting of 10 pages.

* cited by examiner

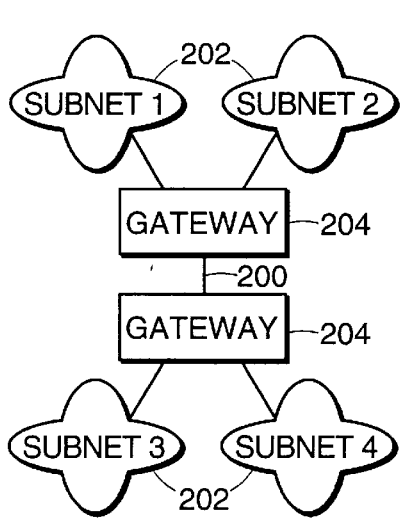
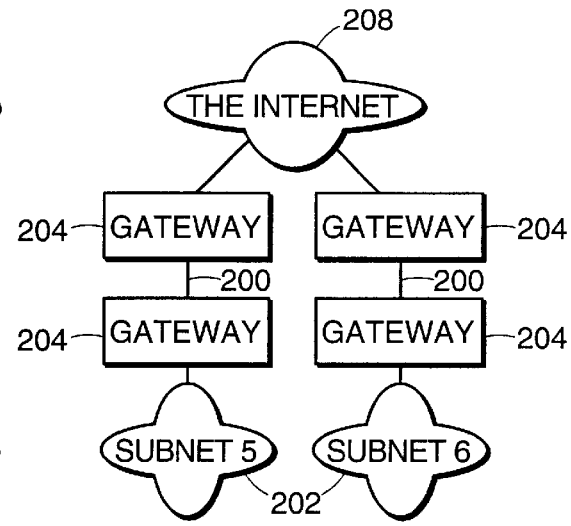
FIG. 9A          FIG. 9B
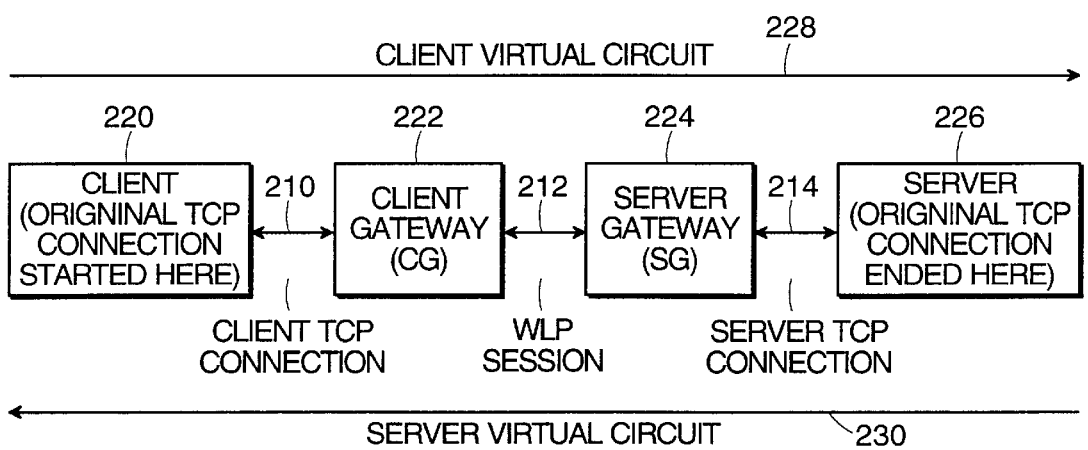
FIG. 10

METHOD AND APPARATUS FOR IMPROVING EFFICIENCY OF TCP/IP PROTOCOL OVER HIGH DELAY-BANDWIDTH NETWORK

RELATED APPLICATION(S)

This application claims the benefit of U.S. Provisional Patent Application, Ser. No. 60/077,064, filed Mar. 6, 1998, entitled "Efficient Transmission of TCP/IP Via Satellite", the entire teachings of which are incorporated herein by reference.

GOVERNMENT SUPPORT

The invention was supported, in whole or in part, by a grant, Number AF19628-95-C-0002 from Department of Air Force SMC/MCX. The Government has certain rights in the invention.

BACKGROUND OF THE INVENTION

The Transmission Control Protocol/Internet Protocol (TCP/IP) suite that forms the basis of the Internet was designed and optimized to operate in a terrestrial environment. Despite this fact, TCP/IP will operate over an extremely large range of link conditions, albeit at reduced levels of performance when the assumptions inherent in its algorithms are violated. For instance, the high delay-bandwidth product and higher bit error rate of a satellite link results in a situation in which the satellite link is not efficiently utilized and the TCP/IP performance (as perceived by an interactive user) is poor.

The use of wireless links provides a very flexible way to extend networks where a wired infrastructure is not available or is not cost effective, but there are a number of important technical issues that need to be addressed. These issues revolve around the fact that most protocols are optimized to run on terrestrial networks. The primary differences between terrestrial and wireless connectivity are the link latency, the bit error rate (BER), and channel asymmetry. In a terrestrial system, error rate is typically low ($<10^{-10}$) and the latency is short (<30 ms), while on a wireless link, the BER can range from $10^{-10}$ to $10^{-3}$ and, in some cases, the round trip latency can exceed 1.0 second. In addition, wireless links tend to be asymmetric with some systems having 100 times or more available capacity in one direction than the other.

In some scenarios, the physical characteristics of the wireless link are such that the assumptions about link quality and latency inherent in the TCP design are rendered invalid and poor performance results. In these cases, the poor performance may be attributed to a combination of TCP's automatic repeat request (ARQ) and flow control (FC) algorithms. The ARQ algorithm uses a combination of strategies that depends heavily on the TCP implementation used at each end of the connection. In some scenarios, especially if the receiving host does not buffer segments received out of order, an ARQ strategy that is not appropriate for a wireless link may result and, performance will be degraded due to unneeded retransmissions and/or inefficient use of the link.

The TCP FC algorithm also may contribute to poor performance on a wireless link. The existing FC algorithm does not differentiate between packets that are lost (due to congestion) and packets that are received in error (due to bit errors). On a terrestrial link the error rate is very low, so almost no packets are received in error. On a satellite link, however, the situation is the opposite, e.g., almost no packets are lost and many are received in error. The result is that TCP detects congestion where there is none and reacts by reducing the transmission rate to alleviate the congestion, causing the link utilization to shrink further. As with the ARQ algorithm, the exact effects are implementation dependent.

Another effect that can be attributed to the FC algorithm is the slow ramp up of data flow. Most Internet communication occurs on short duration virtual circuits. In other words, the virtual circuit is set up, a small amount of data is sent and received, and the virtual circuit is torn down. On a high delay bandwidth product channel, where delay bandwidth product is defined as the data rate of a channel multiplied by the round trip time of the channel, TCP's slow start algorithm initially takes a long time before it can fully utilize the bandwidth available on a virtual circuit. Slow start is intended to prevent a host from bursting data at the start of a TCP connection and works in the following manner.

TCP has a congestion window that is set to the length of one packet (or segment) at the start of a TCP connection. TCP is only allowed to send up to a congestion window's amount of unacknowledged data at a time. The rate of increase of this congestion window is such that for every segment that is acknowledged the congestion window grows by the length of one segment. Hence, the congestion window grows exponentially at the start of a connection. Note that in most implementations, acknowledgments are delayed and only every second segment is acknowledged, resulting in sub-exponential growth. The TCP connection is often finished before TCP's congestion window gets large enough to fully utilize the wireless link.

SUMMARY OF THE INVENTION

In accordance with the present invention, a method of communicating over a link which may be a high delay-bandwidth link, such as a satellite link, comprises receiving, at a source gateway, incoming packets directed to a destination address, in a first protocol, preferably transmission control protocol (TCP) over Internet protocol (IP), or TCP/IP. At the source gateway, the destination address is modified so that the packets are forwarded to a source gateway application, or protocol translator, in the first protocol. The original TCP connection is terminated at the source gateway, and acknowledgments are transmitted from the source gateway back to a source.

From the source gateway application, the packets are forwarded in a second protocol over the link to a destination gateway application. The destination address is communicated to the source gateway application, and then to the destination gateway application. In the destination gateway application, the destination address is used to determine where to send packets. Finally, the packets are forwarded from the destination gateway application to the destination address. Preferably, packets are forwarded from the destination gateway application to the destination address in the first protocol.

To maintain a low susceptibility to transmission errors, the packets may be transmitted or forwarded over the link by fragmenting the packets, in the source gateway application, into smaller packets. In the destination gateway application, the original packets are reconstructed from the smaller packets.

Preferably, in the second protocol, upon an automatic repeat request (ARQ) from the destination gateway application to the source gateway application, only packets which are incorrectly received by the destination gateway application are retransmitted from the source gateway application. The packets may therefore arrive at the destination gateway application in scrambled order, and are reordered in the destination gateway application into their original order. Incorrectly received packets are retransmitted K times where K depends on the BER. This ensures that the packets are correctly received within one round trip time.

Information from the source gateway application, comprising the destination address and a channel identifier, is transmitted to and stored at the destination gateway application. The channel identifier is appended to packets before their transmission over the high delay-bandwidth link, and the destination gateway application uses the received channel identifier to identify the stored information.

Preferably, forwarding a received packet to the source gateway application is done by replacing the destination address in the packet with an address of the source gateway application. The original destination address is restored at the destination gateway application.

To reduce acknowledgment traffic, acknowledgments preferably are sent over the high delay-bandwidth link only periodically. Only a list containing the first sequence number and the last sequence number of a series of contiguously received packets is sent back to the source gateway application.

Preferably, a source self-network address translator (SNAT) on the source gateway replaces the destination address of each incoming packet with the source gateway application's address. The SNAT forwards the original destination address to the source gateway application. The source and destination gateway applications communicate over the high delay-bandwidth link using a second protocol which ensures that the link is error-free and ordered. The destination address is communicated from the source gateway application to the destination gateway application over the link. The source gateway application sends the packets over the link to the destination gateway application.

The destination gateway application in turn forwards the packets to the destination address, preferably using the first protocol by which the addressing information of the destination gateway application is appended to the packets as the source address. The original source address is forwarded from the destination gateway application to the destination SNAT on the destination gateway, and the SNAT replaces the destination gateway application's address information with the original source address to make the protocol conversion transparent to the final destination.

In a preferred embodiment, a request for a communications session sent by a first end-user to a second end-user in a first protocol is received by a first or source gateway. At the first gateway, the original addressing information of the first protocol is modified, causing the request to be processed by the first gateway. The first communications session or source connection with the first end-user, is established utilizing the first protocol. A second communications session is established with the second gateway, over the transmission medium, utilizing a second protocol.

At the second gateway, a third communications session, or destination connection with the second end-user is established, preferably utilizing the first protocol. The request's original addressing information is restored.

On the first communications session, packets are forwarded from the first end-user to the first gateway, and from the first gateway to the first end-user. The first protocol is used and addressing information is modified when necessary.

On the second communications session, packets are forwarded from the first gateway to the second gateway, and from the second gateway to the first gateway. The second protocol is used over the second communications session.

On the third communications session, packets are forwarded from the second gateway to the second end-user, and from the second end-user to the second gateway. Preferably, the first protocol is used and addressing information is modified when necessary.

Packets forwarded from the first end-user to the first gateway are preferably forwarded by changing their addressing information to that of the first gateway. The addressing information is changed by a Self Network Address Translation (SNAT) module running on the first gateway. The SNAT module receives an incoming packet which is destined for the second end-user, and checks the addressing information against a list of rules to determine whether the addressing information should be changed. If a rule is matched, the addressing information is changed, and the original addressing information of the packet is stored.

Where the first protocol is TCP/IP, the SNAT module is inserted into a protocol stack of the first gateway below the IP module, and is configured to change the source IP address and TCP port, the destination IP address and TCP port, and the TCP and IP checksums, of the packets.

The SNAT is configured by a protocol translator, or gateway application, running on the first gateway. In addition, the SNAT may change the addressing information of packets sent to particular TCP ports at the second end-user.

A protocol translator on the first gateway receives packets via the first communications session and sends them over the second communications session. The protocol translator receives a start of the first communications session, and then sends a message to the SNAT module on the first gateway, requesting addressing information of the second end-user. A second communications session with a second gateway is established and the addressing information of the first and second end-users is sent to the second gateway. Data packets are received on the first communications session. The packets are processed, and sent on the second communications session. In the reverse direction, data packets are received on the second communications session, processed, and sent on the first communications session.

A second protocol translator on the second gateway receives packets via the second communications session and sends them on the third communications session. Preferably, on the second communications session, the second protocol translator receives the original addressing information of the first and second end-users. A new socket to a new TCP port is opened to communicate with the second end-user. From the second protocol translator, a message is sent informing a second SNAT module on the second gateway that the source addressing information of packets sent from the new socket should be changed to that of the first end-user. A third communications session is established between the second protocol translator and the second end-user.

Data packets are received on the second communications session. The packets are then processed and sent on the third communications session. Data packets are received on the third communications session, processed, and sent on the second communications session. Processing of packets may comprise, but is not limited to, data compression, data decompression, encryption and decryption, or any combination thereof. Compression allows the amount of data that needs to be sent on the wireless link to be reduced, further improving efficiency. Encryption is used to ensure that data sent on the wireless link remains private. The architecture of the present invention allows TCP connections to be compressed independently or in bulk.

Processing may also consist of prioritization and billing. For example, packets from customers who pay for a premium service may be given priority service to the wireless link. In addition, customers may be billed based on the number of packets sent, when they are sent, and what priority they are given.

Preferably, the protocol translator receives all packets modified by the SNAT module on one particular TCP port.

Preferably, the link layer maintains one receive buffer for all sessions between the first gateway and the second gateway. At the link layer, an automatic repeat request (ARQ) algorithm is used to maintain reliability. The ARQ algorithm may be such that an ARQ sender conveys its entire receive buffer state to an ARQ receiver. Preferably, the ARQ algorithm determines whether to send an ARQ message based on the sequence numbers of messages received. Alternatively, the ARQ algorithm determines whether to send an ARQ message based on a period of time.

Preferably, only packets using the first protocol have their addressing information changed.

In an alternate embodiment, forward and return paths of the second communications session use different physical networks and/or physical media. Such asymmetric links drastically reduce system complexity with respect to existing methods.

In yet another embodiment, an end-user and its associated gateway are the same computer.

The present invention improves the performance of the TCP/IP protocol suite in a wireless or other high delay-bandwidth environment, increasing the wireless link utilization and dramatically improving the performance. Software is added to gateways at the periphery of the wireless segment of a network.

The present invention allows higher layer protocols such as TCP to operate seamlessly over wireless networks. Its approach has many advantages. For example, it may be configured to operate completely transparently to end users. In addition, the present invention offers nearly optimal use of wireless links, requires no modifications to end users protocols or applications, and requires no modifications to the protocols on the gateways. Access to operating system or protocol source code is not required, so that the present invention may be used with proprietary third party operating systems and protocol implementations. It can be used to impose any desired notion of fairness and can process data to improve the transmission efficiency on the wireless link. Finally, the present invention can be used as a generic protocol converter or it can be configured to operate as a firewall.

There are many advantages to converting TCP to another protocol at the gateway. For example, because there is no concept of TCP on the high-delay and/or the high error-rate wireless segment, the detrimental effects of latency and errors on TCP are avoided and link utilization is greatly increased. TCP/IP headers are replaced with a much shorter WLP header, leaving more bandwidth for data. In addition, TCP/IP data may be compressed so that fewer bytes need to be sent over the wireless segment, thus improving data transfer times. Encryption may also be used to protect data from eavesdropping. Finally, the system may be implemented without making any changes to the TCP/IP code on the gateway. No changes of any kind are required to the end users.

The present invention's approach is compatible with all standard TCP/IP implementations and any applications desired. The system may be configured in several different manners depending on the task at hand. In a transparent embodiment, it may be inserted anywhere within an IP network, subject to some weak topological constraints, and will boost performance without making any changes outside of the wireless segment. It can also be configured in a "last hop" mode for individual wireless hosts. In this case, the present invention must reside on the wireless host.

Technically, IP makes no assumptions about link quality, offering only a best effort service. However, protocols such as UDP, TCP, ICMP, RIP, OSPF, etc. that ride on top of IP, assume that errors on the link are an exception, not the rule. Therefore, it is important that the impact of link errors be reduced for proper operation of the protocols and applications that use IP. This implies that non-TCP datagrams require some special handling as well. The present invention has been designed to alleviate the deficiencies of these protocols when operating in a wireless environment.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 9A and 9B are block diagrams illustrating valid network topologies.

FIG. 10 is a block diagram illustrating the framework for a generic, transparent embodiment of the present invention.

DETAILED DESCRIPTION OF THE INVENTION

Figure 1:
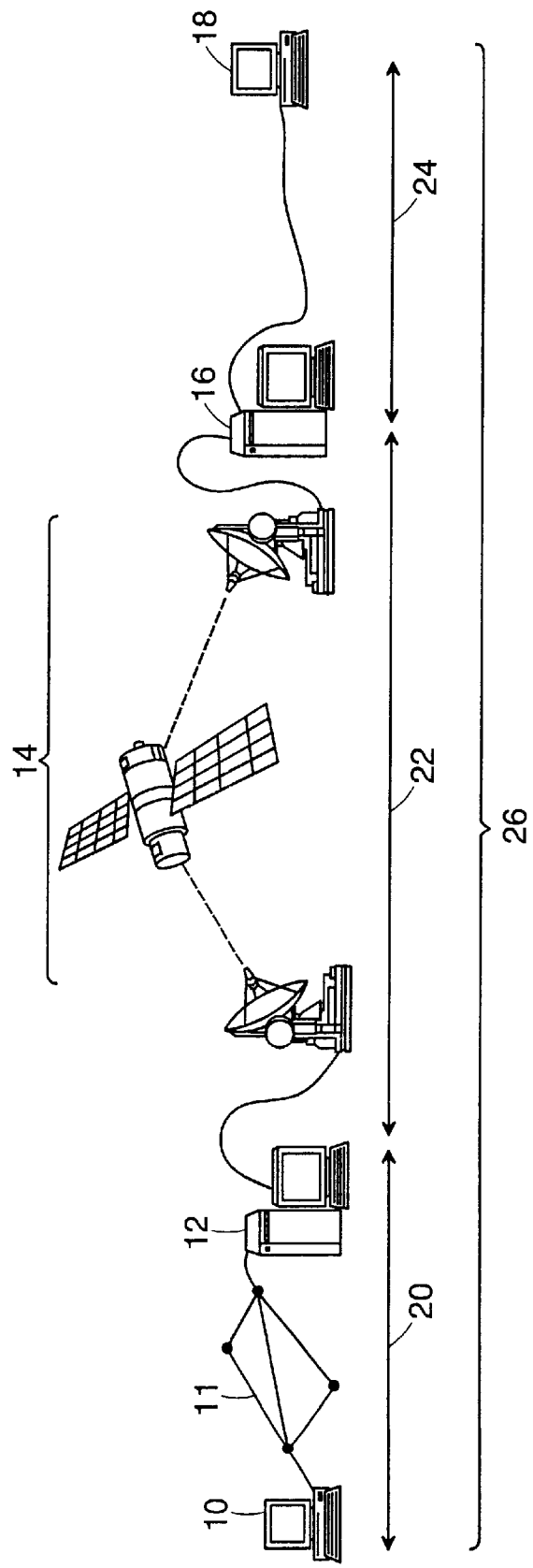
FIG. 1 is an illustrative diagram of a communications system having a satellite link, in which the present invention is used.

FIG. 1 illustrates how a preferred embodiment of the present invention splits a TCP connection 26 into three segments. A source node 10 originates the TCP connection by transmitting a TCP SYN packet to the destination node 18. The TCP packet travels over the source segment 20 to a source gateway 12 which intercepts the packet and converts it to a second, non-TCP protocol. The packet is then transmitted across the wireless link 22 in this second protocol, and is received by a destination gateway 16. The destination gateway converts the packet back to TCP and forwards the packet to the destination node 18 over the destination segment 24. Once the connection is established, packets travel back and forth from source to destination or from destination to source, and are translated by the gateways 12,16 for transmission over the wireless link 22. Note that either or both of the source or destination segments 20,24 may comprise a network. For illustration purposes FIG. 1 shows a network 11 in the source segment 20.

In practice, either node 10, 18 may be both a source and a destination at various times. In addition, "client" is used interchangeably with "source", and "destination" interchangeably with "server", but again, a node may be both a client and server. Generally, then, we refer to the requester of information as the source or client node, and the responding node as the destination or server node. For simplicity of discussion, we always choose one node as the source or client, and the other node as the destination or server.

Typically, the source segment 20 and destination segment 24 use terrestrial connections and operate using unmodified TCP/IP protocols. However, the gateway to wireless link 22 uses a special wireless link protocol (WLP) which compensates for the physical characteristics of the satellite path 14. Software at each gateway 12, 16 converts packets from TCP to WLP as they enter the wireless gateway-to-gateway connection 22, and converts them back to TCP as they exit the connection 22.

The present invention may be configured in several different ways. In addition, the present invention may be used as a firewall, router or load balancer in any of these configurations. The configurations are referred to with respect to whether they provide address translations generically and/or transparently. A generic translator is protocol (application) independent, while a non-generic translator is protocol (application) specific. A transparent translator operates without an end-user needing any knowledge of its existence or needing to follow special procedures, while a non-transparent translator requires either explicit knowledge or special procedures.

Generic, Transparent Embodiment

Figure 2:
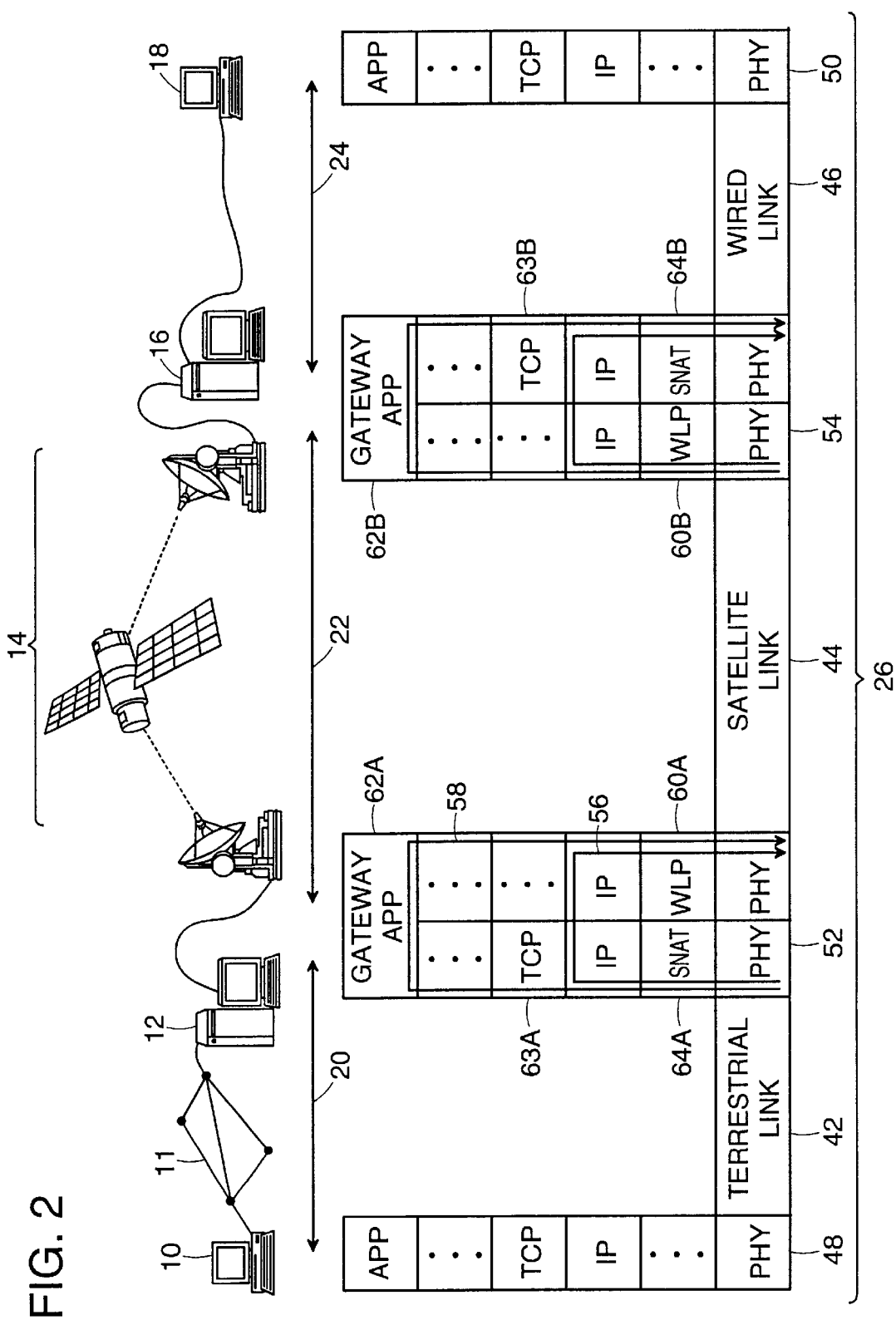
FIG. 2 is an illustrative diagram of the protocol stacks used in the present invention.

FIG. 2 illustrates the present invention's generic transparent (GT) embodiment. Protocol stacks 48, 50, 52, 54 are shown below the corresponding nodes and gateways. The end users 10, 18 have standard commercial TCP/IP protocol stacks 48, 50 respectively and run without modification. In addition, the users 10, 18 do not need to know that they are communicating through a wireless link 44, and do not need to use any special procedures. At the periphery of the wireless portion of the network, gateways 12, 16 use modified protocol stacks 52, 54 respectively. Since these gateways 12, 16 are small in number and are aware of the presence of the wireless segment 22, the burden encountered in configuring them with a non-standard protocol stack is small and within the scope of an organization providing the "TCP/IP via Wireless" service.

The modified gateways 12, 16 perform the protocol translation from TCP to WLP for incoming packets and WLP to TCP for outgoing packets. The WLP protocol provides a reliable connection-oriented link between the gateways 12, 16. Error control may be accomplished using either forward error control (FEC) coding or automatic repeat request (ARQ). Note that because the present invention performs true protocol conversion, no TCP or IP headers are transmitted on the wireless link. They are replaced with a small WLP header, reducing required bandwidth.

In addition, WLP allows for packet fragmentation and reassembly, reducing the amount of data that must be retransmitted when a link error occurs. Note also that because the present invention uses a link layer to improve TCP performance instead of a transport layer, a single pool of buffer space for all data flowing through the WLP may be maintained. This is important as only 2*Delay*Bandwith worth of buffer space is needed for the entire system while most other approaches that split TCP connections use 2*Delay*Bandwidth per TCP connection.

System operation is as follows. IP packets which do not contain TCP segments, or which use secure IP (IPSEC), arrive at the periphery of the wireless network, i.e., the client gateway 12, and go up the protocol stack 52 to the IP layer where the standard routing functions are performed, as shown by arrow 56. The packets go down the protocol stack 52 through the WLP layer 60A and are transmitted over the satellite link 44 which corresponds to the wireless segment 22. Errors encountered during transmission are corrected by the two peer WLP layers 60A, 60B, transparently to IP.

TCP packets, on the other hand, pass all the way up the protocol stack 52 to the source gateway application 62A, as indicated by arrow 58. Here, the source TCP connection, which exists within source segment 20, is terminated, and a virtual circuit to the destination gateway application 62B on the other side of the wireless link is established using WLP. The destination gateway 16 then establishes a destination TCP connection to the intended destination node 18 within the destination segment 24.

Once the connections are established, data is passed over the wireless link 22 to the destination gateway 16 where it is forwarded to the intended destination node 18. Data may be sent with the initial connection, as is done in T/TCP, another protocol in the TCP/IP suite. Because the source TCP connection is not on wireless link 22, none of the problems associated with sending TCP via wireless are encountered.

The key to operation is a Self Network Address Translator (SNAT) 64A, 64B. The SNAT is responsible for performing address mapping on incoming and outgoing packets so that they are processed by the respective gateway applications 62A, 62B or properly routed to their destinations (which may be the source or destination node).

Before describing how a SNAT functions, we first review TCP and IP semantics. A TCP socket consists of an IP address and a TCP port. Since socket is a term particular to TCP, we use the term "addressing information" to broadly include the term "socket". Two TCP sockets, a source socket and a destination socket, uniquely define every TCP connection. In addition, an IP packet identification number helps to uniquely identify each IP packet sent from a source. When a packet is fragmented by IP, each fragment has the same identification number.

Now, consider packets flowing from the source/client 10 to the destination/server 18. The SNAT 64A at the source gateway 12 changes the destination addressing information of unfragmented TCP packets received from the client such that the destination address becomes that of the source gateway 12 and the destination port is changed to that of the source gateway application 62A. The packets are then processed in a normal fashion by the TCP/IP code on the source gateway 12.

The SNAT 64A also changes the source port of the packet to enable the source gateway 12 to identify packets intended for different destinations. If the packet is a fragment of a TCP packet, the SNAT 64A changes the IP destination. If the fragment contains a TCP header, the SNAT also changes the source and destination ports. The source gateway application 62A receives the packets from the TCP layer 63A and forwards them to the WLP layer 60A, which transmits them over the satellite link 44. On the other end of the satellite link 44, the destination gateway application 62B receives the packets from its WLP layer 60B and forwards them to the destination TCP layer 63B. As a TCP packet leaves the destination gateway 16, the destination SNAT 64B changes the source addressing information back to the original source address and port. In this manner, the existence of the gateways 12, 16 and the wireless link 22 are completely hidden from both the source and destination nodes 10, 18.

The Generic/Transparent (GT) embodiment has the property that all TCP applications, i.e., HTTP, FTP, etc. may be supported without modifying procedures and/or protocols. GT WISE can support Secure Sockets Layer (SSL).

Figure 3:
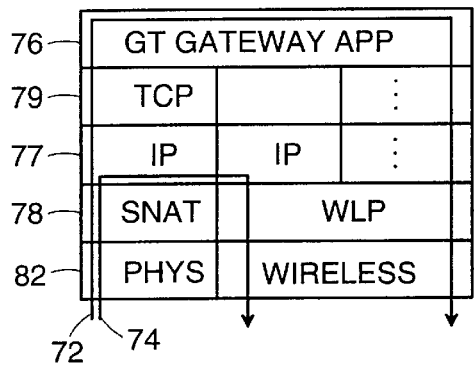
FIG. 3 is a schematic diagram of a gateway protocol stack for a generic, transparent embodiment of the present invention.

FIG. 3 shows the protocol stack 70 for a GT embodiment, as well as paths 72, 74 taken by various packets. The GT embodiment uses three distinct modules to operate as a generic transparent protocol converter—the gateway application module 76, the SNAT module 78, and the Wireless Link Protocol module (WLP) 80, corresponding respectively to 62A, 64A and 60A of FIG. 2.

Path 72 is taken by all TCP packets with non-encrypted TCP headers, while path 74 is taken by all other packets such as IPSEC and non-TCP packets. The physical interface 82 may be connected to either the Internet or a local subnet. The wireless interface 84 is connected to the wireless link 44 (FIG. 2). The IP and TCP modules 77, 79 are standard off-the-shelf modules provided by the operating system being used and require no code modifications.

The GT source gateway application module 76 can be viewed as a generic protocol converter or translator that changes TCP packets to WLP packets. The application 76 receives TCP packets arriving at the physical interface 82 from local subnets, converts these packets to WLP packets, and sends or forwards the WLP packets over the wireless link via the wireless interface 84. At the other end of the wireless link (not shown), a second or destination gateway application module converts the WLP packets back to TCP packets. GT gateway application modules do not depend on the information within a TCP packet, so a single gateway application can support the conversion of multiple application layer protocols.

Each GT gateway application 76 listens for incoming TCP connections on its main socket, which differs from the destination socket of packets traversing the wireless link. To reach the GT application, TCP packets must have their destination addressing information changed. The GT SNAT 78 module performs this function, selectively changing the destination addressing information of incoming packets which are to be transmitted on the wireless link, to that of the gateway application's main socket, forcing the connection to be terminated by the TCP/IP protocols on the gateway.

Referring back to FIG. 2, when the destination gateway 16 receives a packet from the satellite link 22 and forwards the packet to its intended destination 18, the forwarded packet at first bears as its source socket or addressing information the address of the destination gateway 16. Therefore, the packet's source addressing information must be changed from that of the destination gateway 16 to that of the host 10 which originally sent the packet. Changing the destination address of incoming packets and the source address of outgoing packets allows the gateways 12, 16 to operate transparently to the end users 10, 18. In other words, from their perspective, the end users are communicating with each other and have no knowledge of the gateways.

The source port information of incoming TCP packets is changed, not to maintain transparency, but to ensure that the TCP layer 79 (FIG. 3) on the gateway does not become confused. Such confusion could occur when two identical source sockets attempt to send data to two distinct destinations which can only be reached via the wireless link. Here, the gateway would not be able to determine which data should be sent to which destination unless source-addressing information is changed.

All IPSEC and non-TCP packets pass through the SNAT module unchanged, along path 74. The WLP module is responsible for ensuring that messages transferred on the wireless link stay ordered and error-free. Because TCP/IP headers are not sent over the wireless link with each packet, the amount of non-data oriented traffic sent on the wireless link is reduced.

Non-generic Non-transparent Embodiment (GNT)

Figure 4:
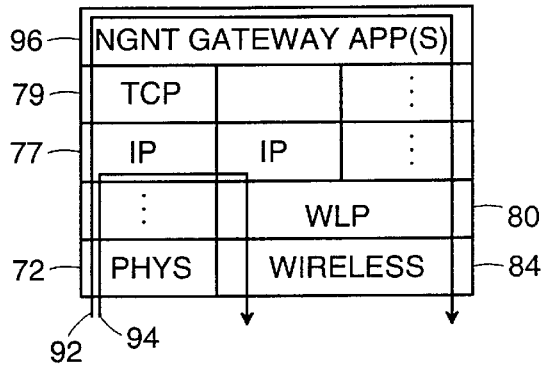
FIG. 4 is a schematic diagram of a gateway protocol stack for a non-generic, non-transparent embodiment of the present invention.

FIG. 4 shows the protocol stack 90 for a NGNT embodiment. The NGNT embodiment maintains a great amount of control over what data may be sent through the gateway. NGNT uses two or more modules to perform as a non-generic, non-transparent protocol converter for specific TCP applications.

Path 92 is taken by all TCP packets, and path 94 is taken by all other packets. As with the GT embodiment of FIG. 3, the physical interface 72 is connected to either the Internet or an internal subnet, and the wireless link interface 84 is connected to the wireless link. The IP and TCP modules 77, 79 are standard off-the-shelf modules and the WLP 80 module is the same as that used by the GT embodiment of FIG. 3.

Each NGNT gateway application 96 handles one or more application layer protocols. Client applications must be aware of the translator and must send their TCP packets directly to the appropriate main gateway application socket. More than one main gateway application socket may be used. For instance, the main socket for HTTP might have a TCP port of 8000 while the main socket for NNTP might have a TCP port of 8100. A NGNT gateway application 96 must understand the application protocols being used on its sockets and interact properly with the client.

Unlike the GT embodiment, a NGNT embodiment is capable of providing full enhancement to IPSEC-encrypted connections. In GT, the use of a SNAT module 78 precludes the use of IPSEC, because IPSEC ensures that TCP header information is not modified in any way, while the GT SNAT 78 (FIG. 3) must modify the TCP header. NGNT does not need a SNAT module, because the IP layer 77 routes all TCP packets to be sent on the wireless link directly to the NGNT gateway application 96, as indicated by path 92. Thus, IPSEC can be utilized if it is available on the gateway,.

Generic, Non-transparent Embodiment (GNT)

Figure 5:
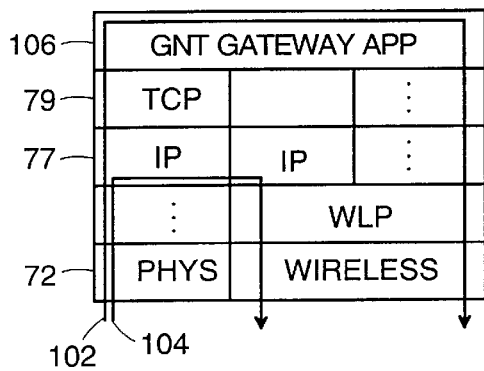
FIG. 5 is a schematic diagram of a gateway protocol stack for a generic, non-transparent embodiment of the present invention.

FIG. 5 shows the protocol stack 100 for a Generic/Non-transparent (GNT) embodiment. The GNT embodiment is meant to provide generic protocol conversion for applications that use a uniform method for communicating with a proxy, as is the case for the widely used SOCKS protocol. While GNT requires modifications to clients, many clients already support functionality such as SOCKS, and all applications can be supported with GNT WISE. It is important to note that servers on the Internet to which clients may want to connect may not be running any protocols such as SOCKS. Hence, when a client can reach a GNT gateway, the corresponding server should use a NGNT gateway (FIG. 4).

A preferred GNT embodiment uses two modules to perform as a generic, non-transparent proxy. Path 102 is taken by all packets using TCP or UDP protocols, while path 104 is taken by all other packets. As with the GT and NGNT embodiments, the physical interface 72 is connected to either the Internet or a subnet, and the wireless interface 84 is connected to a satellite terminal. The IP and TCP modules 77, 79 again are standard off-the-shelf modules.

For GNT, a TCP packet which must traverse the wireless link is sent from a modified client directly to the GNT gateway application 106 via path 102. The final destination of the packet is negotiated via communication between the client and the gateway using a predetermined protocol, e.g., SOCKS. The client GNT gateway application 106 simply forwards packets it receives from the terrestrial link to a server NGNT gateway application (not shown) over the wireless network. The server NGNT gateway application then forwards the packets to the final destination. The client GNT gateway application 106 runs on the main gateway application socket and does not need to understand the application protocols for which it is proofing. Instead, it must know how to interpret the protocol containing the stored final destination information.

Non-generic, Transparent Configuration (NGT)

Figure 6:
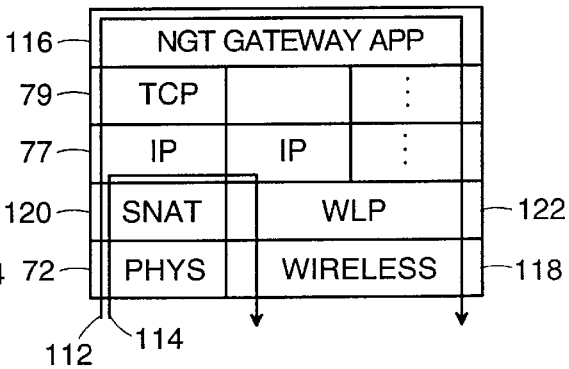
FIG. 6 is a schematic diagram of a gateway protocol stack for a non-generic, transparent embodiment of the present invention.

FIG. 6 illustrates a protocol stack 110 for a NGT embodiment which is very similar to a transparent firewall, exercising great control over data traversing a gateway without any of the clients knowing the gateway exists. A preferred NGT embodiment uses at least three distinct modules to perform as a non-generic, transparent translator for TCP applications. Here, path 112 is taken only by TCP packets which use certain TCP ports. Path 114 is taken by all other packets, including IPSEC, non-TCP and non-translated TCP packets. The physical interface 72 is connected to either the Internet or a subnet whose only access to the Internet is via the gateway, and the wireless interface 118 is connected to a satellite terminal. As with the other embodiments, the IP and TCP modules 77, 79 are standard off-the-shelf modules.

As with the GT embodiment described above, the gateway application 116 converts TCP packets to WLP packets. In a preferred NGT embodiment, however, each gateway application 116 understands the application protocol for which it is translating. The gateway application 116 directly interacts with the end-user application, although the end-user does not need to know about the gateway application.

Some NGT gateway applications may need to keep state information about their interactions with end-users and may need to relay that information to gateway applications on other gateways. Since state information is different for each end-user application, a separate inter-gateway application protocol is used for each application.

The SNAT and WLP modules, 120, 122 respectively, behave in the same manner as in the GT embodiment. A NGT embodiment may be used instead of NGNT when a firewall is needed, but the cost for configuring all clients to work through a gateway is prohibitive for applications that cannot normally be used with proxies.

A hybrid NGT/NGNT system may be used that is transparent to a local subnet but not to the Internet. In such a case, IPSEC and a secure sockets layer (SSL) may be used on the portion of the TCP connection that traverses the Internet.

Asymmetric and Mixed Media Links

Asymmetric networks in which the forward data path bandwidth and reverse data path bandwidth are drastically different are in common use today. TCP can encounter problems on asymmetric networks because, in fully utilizing a high-bandwidth satellite link, TCP generates too many acknowledgments for the low-bandwidth forward path to handle. The present invention is well suited to asymmetric networks because the ARQ algorithm utilized by the WLP module generates very little acknowledgment traffic.

Figure 7:
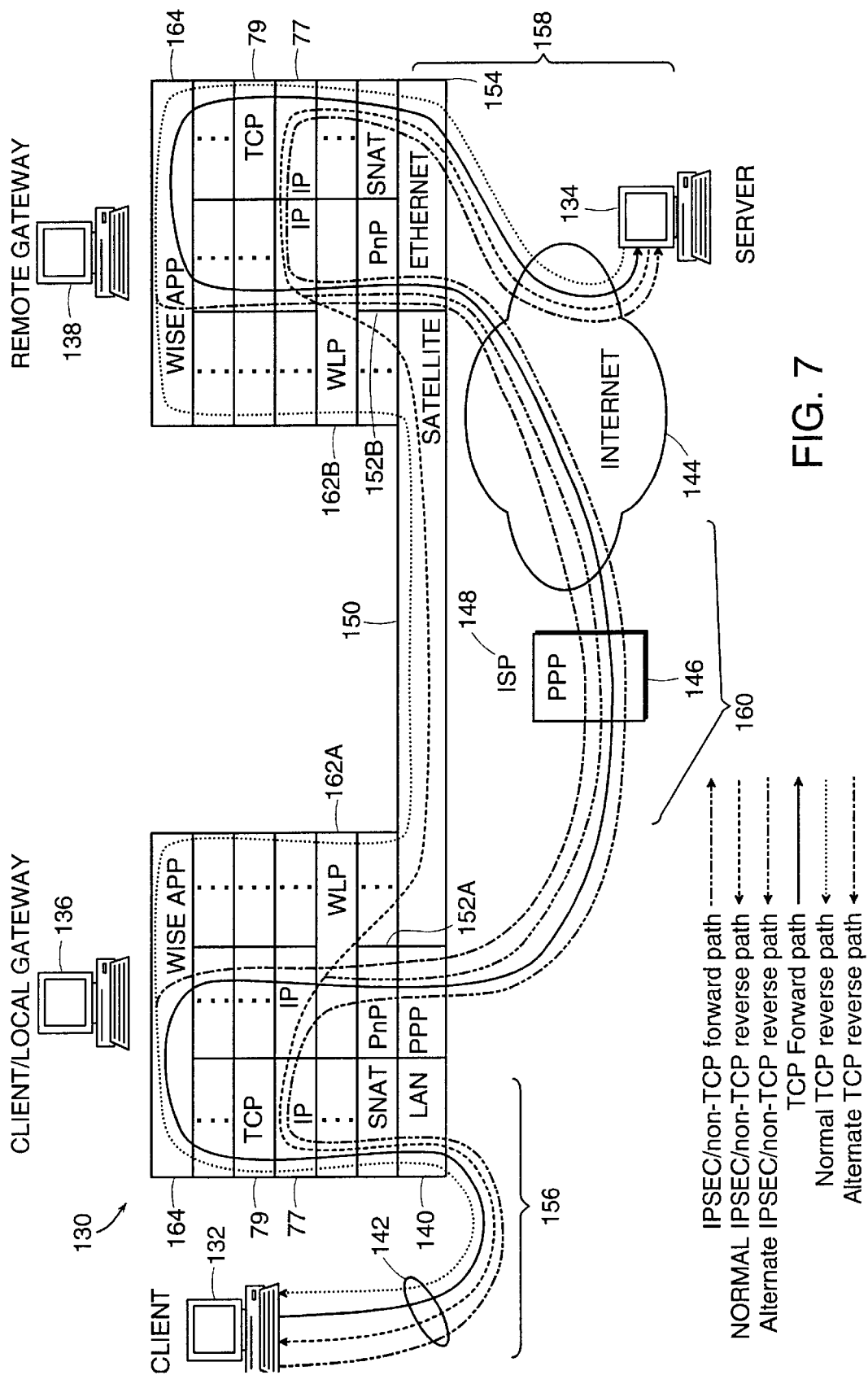
FIG. 7 is a schematic diagram illustrating an embodiment of the present invention employing an asymmetric network.

FIG. 7 illustrates a network 130 which uses a preferred asymmetric embodiment of the present invention for a system with a phone connection for a forward path and both a phone connection and a satellite link in the reverse path. A client 132 communicates with a server 134 through a pair of asymmetric GT gateways 136, 138. The local gateway 136 has three physical interfaces. The local area network (LAN) interface 140 is connected to the client LAN or subnet 142 and is the only physical interface through which the client 132 can reach the Internet 144. The PPP 146 interface is a Point-to-Point Protocol connection between the local gateway 136 and an Internet Service Provider (ISP) 148 which is directly connected to the Internet 144.

The client 132 receives most of its data through the satellite link 150. The TCP and IP modules 77, 79 are off-the-shelf modules. The IP-within-IP module 152A, 152B on each gateway is a wrapper for packets which must traverse the Internet 144 and is described below. Although the client 132 and the local gateway 136 are shown as separate computers, they may be combined in one computer.

On the remote gateway 138, the Ethernet interface 154 is connected directly to the Internet 144, as is the server 134. All modules on the remote gateway 138 behave in the same manner as on the local gateway 136.

A preferred asymmetric embodiment breaks the end-to-end TCP connection into three segments. The first segment 156 starts at the client 132 and ends at the local gateway 136. The third segment 158 starts at the remote gateway 138 and ends at the server 134.

The second segment links the two gateways 136, 138 and is broken into two halves 150, 160. The forward path 160 of the segment traverses the low bandwidth Internet link, and usually, the reverse path 150 traverses the high bandwidth satellite link. An alternative reverse path, included in 160, passes through the Internet 144 for applications that have small amounts of data to send and to which the high delay of a satellite link would be extremely detrimental.

One concern about using the present invention on the Internet is that IP on the local gateway 136 normally attempts to advertise on the Internet that it has access to the subnet of the client. Other hosts on the Internet may then try to access the client directly rather than going through the remote gateway 138. However, the only path to the client's subnet should be through the remote gateway 138. To this end, a preferred asymmetric embodiment of the present invention uses IP-within-IP modules 152A, 152B, as is known in the art. For example, IP within IP is described in V. Arora, et al, "Asymmetric Internet Access over Satellite Terrestrial Networks", AIAA Proc. 16th International Communications Satellite Systems Conference 1996.

On the remote gateway 138, the IP address of the IP-within-IP module 152B is the same as that of the IP module above it on the protocol stack. On the local gateway 136, the IP address of the IP-within-IP module 152A is some new value which is on the same subnet as the ISP. Whenever packets are sent from the local gateway 136 or any hosts on the client's subnet 142, they are encapsulated with an IP header having a source address of the local gateway IP-within-IP module 152A and a destination address of the remote gateway IP-within-IP module 152B. Whenever packets are sent via the alternate reverse path 160 between the remote gateway 138 and the local gateway 136, they are encapsulated with an IP header having a source address of the remote gateway IP-within-IP module 152B and a destination address of the local gateway IP-within-IP module 152A.

Since there are two possible return paths for data, the server WLP module 162B is modified slightly to enable it to determine on which path to send a particular packet. The SNAT module behaves in the same manner as for the GT embodiment. The gateway application 164 is modified slightly to enable it to differentiate between TCP applications which should use the reverse satellite link 150 and which should use the reverse phone link 160.

Additional features

The present invention is easily scalable and can be used on wireless links with extremely high bandwidths.

Figure 8:
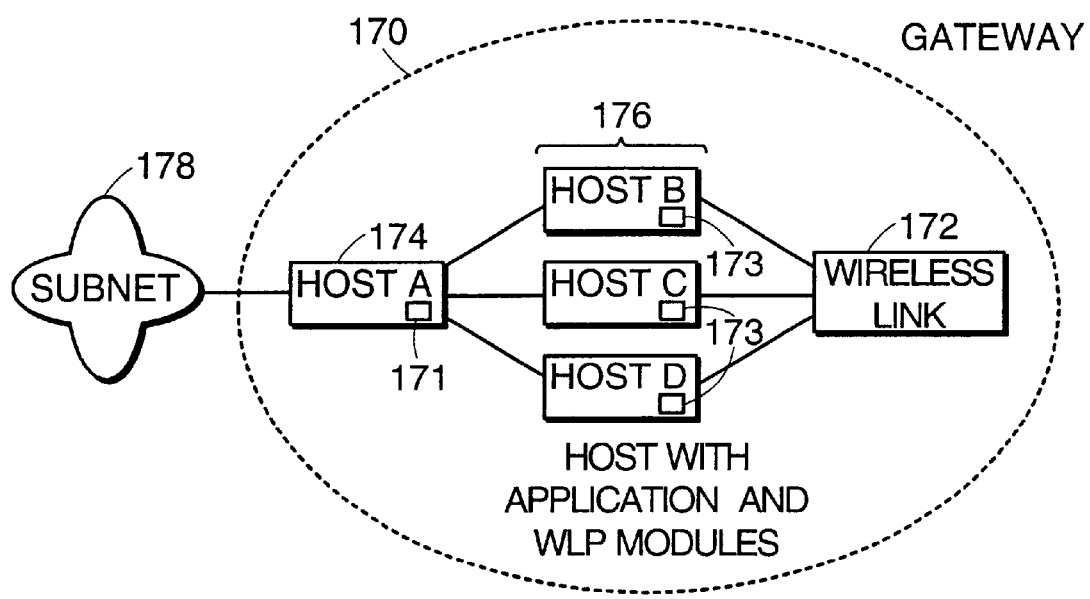
FIG. 8 is a block diagram showing a possible gateway setup for an extremely high bandwidth link, using the present invention.

FIG. 8 illustrates a preferred GT gateway embodiment 170 for an extremely high bandwidth link 172 in which the SNAT module 171 is placed on one host 174 while the gateway applications 173 are placed on other hosts 176.

As shown in FIG. 8, a subnet 178 is connected to the wireless link 172 via one or more gateway applications 173. The actual gateway is split up into four hosts, one of which (Host A 174) has a SNAT module 171 and three 176 of which (Hosts B, C, and D) have gateway application and WLP modules 173. The SNAT 171 module modifies the destination IP address of packets coming from the subnet 178 to one of the IP addresses of the machines 176 on which a gateway application 173 is running. In this manner, any processing performed in a gateway application (such as compression and encryption) can be split among more than one host, for example, by having different sessions processed by different hosts.

In addition, the present invention eliminates TCP/IP headers on the wireless link for connections it can split. For split connections, the present invention can compress data over each connection separately. This allows adaptive compression algorithms to develop better models of the data being compressed, thus improving the compression ratio. This is important, since a model that works well for text might not achieve a high degree of compression for binary data.

Consider bulk compression when it is supporting two connections, such as an ASCII file transfer and an executable file transfer. An adaptive model tracks back and forth between the statistics of the text file and those of the executable file without ever being optimal for either. With independent compression, the model adapts to the statistics of a single type of data yielding optimal compression.

Note that it is imperative that the algorithm has some way of disabling itself when it encounters packets that would be expanded due to an unsuccessful compression attempt. This is especially important when dealing with encrypted packets because good encryption implies that, on average, compression is not achievable.

While there are many benefits to performing compression on a per connection basis, encryption is best performed in bulk. There is little advantage to separating connections cryptographically unless there is a large disparity between the protection required by each connection. Even when this is true, it is probably better to bulk encrypt everything at the highest level of protection than to suffer the overhead of multiple encrypted streams. In some extreme cases, it may be necessary to encrypt on a per connection basis (for example when data leakage from one connection to another is of concern), but when this is the case, there are usually implications that reach far beyond the wireless gateway.

Priority access gives a service provider the ability to offer different levels of services to different customers depending on a negotiated price. The present invention can impose different levels of services on different users based on who the user is, past utilization, or based on generating maximal revenue. Priority access is implemented by assigning a priority to each connection based on predetermined criteria. The gateway application is then modified to read from the open sockets on a priority basis rather than in a round robin fashion.

System Limitations

While the present invention is very flexible and can accommodate many different wireless link scenarios, there are some limitations. These limitations vary for each embodiment. We now discuss these limitations as they apply to specific embodiments.

TCP is known as an end-to-end reliable protocol. As such, connection splitting can be viewed as breaking the end-to-end reliability. In the case of the present invention, TCP provides reliability for the terrestrial portions of the network and WLP provides reliability for the wireless portion of the network. However, the reliability of individual segments of the network is not sufficient to guarantee end-to-end reliability. For example, a server may close one of the TCP connections and a gateway may crash before all of the data has successfully reached the client.

However, while TCP is reliable host to host, there is still no guarantee that data reaches the end-user application. For example, an end host may crash after the connection is closed but before the application reads the data. This would also have the effect of making the server incorrectly believe that the client successfully got that data.

In any case, the reliability of a split connection is no worse than what would be encountered with the common and accepted practice of using a firewall.

Another limitation is that NGNT and GNT embodiments require modifications to the end users. Clients for common protocols, such as HTTP, FTP, TELNET and others, already have built-in capabilities which enable them to be used with a translator. For GNT, neither protocols nor user procedures need to be modified, but various other changes may need to be made to ensure that all TCP packets are sent to the appropriate gateway application. One solution is to modify the way that user applications access TCP, as the SOCKS5 protocol does.

Yet another limitation is the inability to split IPSEC connections. IPSEC encrypts all data that is encapsulated within an IP header. This includes TCP header information. Because preferred GT and NGT embodiments must be able to modify fields in the TCP header in order to operate properly, they cannot split connections using IPSEC. Note however, that the performance of IPSEC connections may still be improved because the WLP module ensures that TCP does not see errors. Hence TCP's congestion control mechanisms will not kick in and decrease throughput.

In addition to the above limitations, preferred GT and NGT embodiments impose some constraints on the network topologies in which they can be used. The topological limitations are similar to those encountered with transparent firewalls. All TCP packets leaving a local subnet must pass through a particular gateway just as they would have to traverse a particular firewall. The issue revolves around the fact that TCP segments from the same TCP connection may take different paths through a network. Because the present invention terminates the TCP connection in a fully compliant TCP/IP protocol implementation, it is necessary that all TCP segments from a given connection pass through the same gateway.

FIGS. 9A and 9B show examples of valid network topologies in which only one route 200 exists between any two subnets 202, forcing TCP packets from a particular subnet to pass through specific gateways 204. In FIG. 9B, packets travel through the Internet 208.

Operation

We now provide detailed descriptions of the operation of preferred and alternate GT embodiments of the present invention. Extensions to other embodiments are straightforward. A GT implementation has the ability to split TCP connections into three segments without either of the connection endpoints knowing that the connection has been split. Furthermore, a GT implementation uses some protocol other than TCP, or a different TCP implementation, on the second of the three segments. Finally, a GT implementation uses three modules—a Self-Network Address Translator module (SNAT), a gateway application module, and a Wireless Link Protocol module (WLP).

FIG. 10 illustrates how each TCP connection that normally connects directly a client to a server is split into three segments. Note that while a server may also initiate a TCP connection, for simplicity it is assumed that the client initiates a TCP connection, and that the server accepts the TCP connection. Note also that when referring to hosts or nodes, "client" and "source" are generally used synonymously, as are "server" and "destination".

The first segment 210 is a TCP connection, the client TCP connection, whose endpoints are the client 220 and a first gateway, or client gateway 222. The third segment 214 is also a TCP connection, the server TCP connection, whose endpoints are the server 226 and a second gateway, or server gateway 224. These segments 210, 214 may be simple links as shown, or they may comprise networks of arbitrary size. The second segment 212 is a WLP session whose endpoints are the client gateway 222 and server gateway 224. The TCP protocol does not run on this segment 212.

Information pertaining to the three segments, how they relate to each other, and how they relate to the original TCP connection is stored on each gateway in the framework of a virtual circuit (VC). A client VC 228 is initialized on the client gateway 222 when the client gateway 222 recognizes that a client 220 is attempting to make a TCP connection to a server 226. Data originally sent in TCP packets from the client 220 to the server 226 is sent on the client VC 228.

A server VC 230 is started on the server gateway 224 when the server gateway 224 is told by the client gateway 222 that a client 220 has attempted to start a TCP connection with the server 226. Data originally sent in TCP packets from the server 226 to the client 220 is sent on the server VC 230.

Topologically, the only way for the client 220 to communicate with the server 226 is through the client and server gateways, 222 and 224 respectively. These gateways 222, 224 are oriented in a manner such that each client can only access one gateway. Prior to any communication between clients and servers, a WLP session is set up between the two gateways 222, 224 that wish to communicate.

Figure 11:
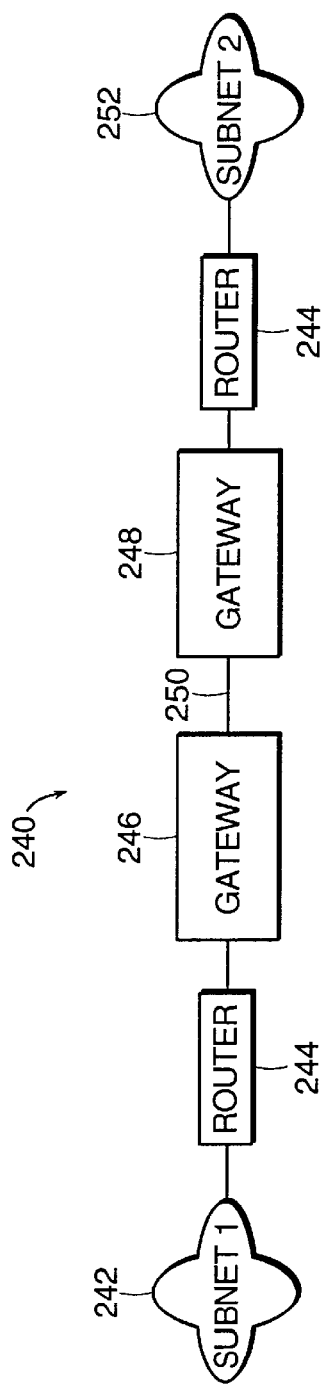
FIG. 11 is a block diagram illustrating a network topology implementation of the present invention.

FIG. 11 illustrates the network topology 240 used in this example. Packets originate at clients located within one subnet 242, and are destined for a host within a second subnet 252 located across the link 250. Routers 244 ensure that only packets which need to traverse the link 250 between the gateways 246, 248, and packets which are themselves addressed to the gateways 246, 248 themselves are sent to the gateways.

Figure 12:
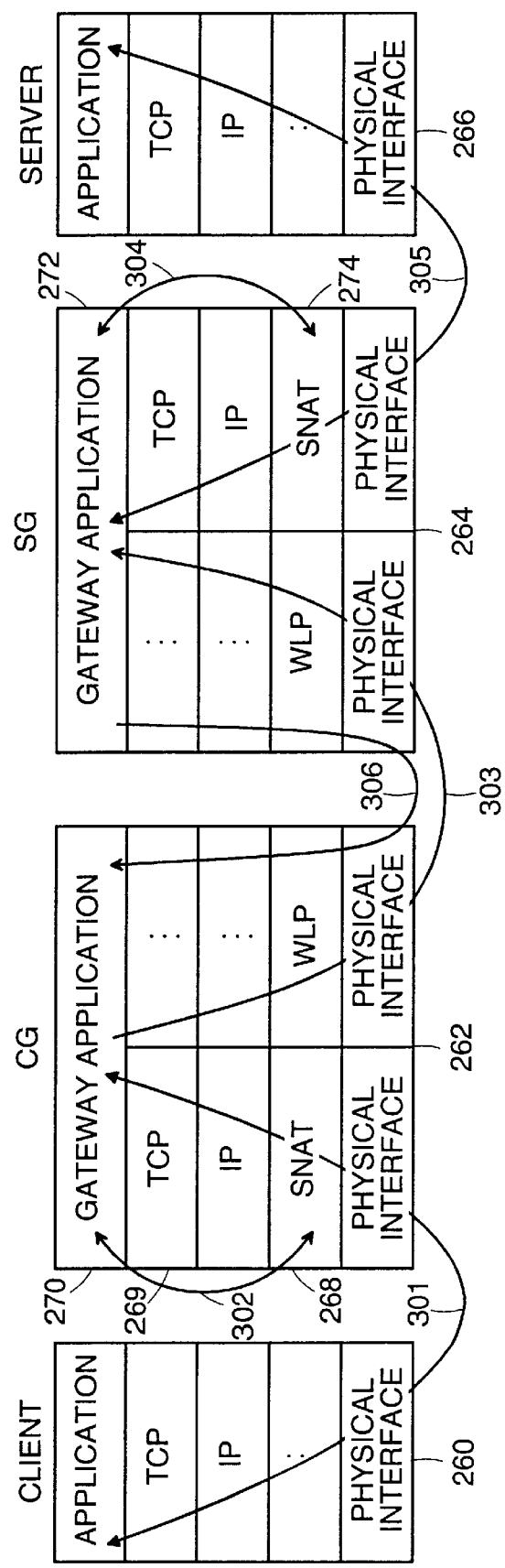
FIG. 12 is a block diagram illustrating the setup procedure for the generic, transparent framework of the present invention.

FIG. 12 illustrates the protocol stacks 260, 262, 264, 266 on the client, client gateway, server gateway, and server respectively, and the procedure through which the GT framework is set up. Normally, when a client starts a TCP connection to a server, the client sends a TCP SYN packet. The server acknowledges the client's SYN by sending its own SYN, and the client acknowledges the server's SYN.

In a preferred GT embodiment of the present invention, when the client attempts to start a TCP connection to the server, the SNAT 268 on the client gateway receives the client's SYN packet and notices that it is destined for the server. The SNAT 268 changes the addressing information in the packet so that the packet is forwarded to the client gateway application 270. The client gateway's TCP module 269 acknowledges the client's SYN and sends its own SYN packet back to the client. The client gateway SNAT 268 modifies this SYN packet so that the client thinks it is coming from the server.

Finally, the client acknowledges the client gateway's SYN and a client TCP connection 301 is established. The client gateway SNAT 268 henceforth modifies all packets for this TCP connection 301 so that incoming packets sent by the client are forwarded to the client gateway, and outgoing packets sent from the client gateway to the client appear to have originated at the server.

The client gateway application 270 receives information from the SNAT 268 as to with which host the client was attempting to start a TCP connection (step 302). The client gateway application 270 initializes a client circuit 303, and informs the server gateway that the client is trying to connect to the server. The server gateway application 272 then initializes a server circuit 306, informs the server gateway SNAT 274 (step 304) that it is starting a server TCP connection 305 with the server, and sends a TCP SYN packet to the server.

The server gateway SNAT 274 modifies the SYN packet so that the packet appears to have come from the client, and henceforth modifies incoming and outgoing packets in a similar manner as the client gateway SNAT 268. Once the server TCP connection 305 has been successfully established, the server gateway application 272 informs the client gateway application 270 of the success, and the client and server communicate with each other through the gateways.

Although the present invention breaks up end-to-end TCP semantics, this has no bearing on flow control. A client or server gateway can use the TCP receive window buffer size to limit the amount of data that is to be sent over the wireless link. Once the receive buffer of a local connection fills up, the local host is not able to send any more data because it sees congestion on the network. The present invention can read data from the TCP receive buffers in a fair manner so that all TCP connections get a fair share of the wireless link. This is important as flow is still controlled fairly on the terrestrial portion of the network.

As stated previously, three modules reside on each gateway: a SNAT module, an gateway application, and a WLP module. Each of these modules is now described in detail.

The SNAT Module

The SNAT module prototype was developed by modifying and adding features to the public domain software package Ipfilter, written by Darren Reed, see http://coombs.anu.edu.au/ipfilter.

The SNAT module is responsible for modifying addressing information in TCP packets, ensuring that TCP connections are split properly and that the existence of the gateways are unknown to the hosts that use them. The SNAT knows which address information to place in TCP packets by following a set of modification rules and storing addressing information about the modifications which must be made for particular TCP connections in a translation table. Additionally, the SNAT relays the addressing information for specific TCP connections to the gateway application module when necessary.

The translation table is preferably a hashtable of linked lists. A one-to-one correspondence exists between entries in the translation table and TCP connections. A translation table entry comprises the fields shown in Table 1.

TABLE 1

| Field: | Description: |
| --- | --- |
| Time to live | The time until the translation table entry should be removed. |
| State | A field that is loosely associated with the state of the TCP connection to which the translation table entry corresponds. |
| Original local address | The IP address of the host (local host) which has a TCP connection that must traverse WISE gateways. |
| Original local port | The TCP port of the local host. |
| Original remote address | The IP address of the host (remote host) with which a local host thinks it has a TCP connection. |
| Original remote port | The TCP port of the remote host. |
| Replacement local address | The IP address with which the original local address is replaced. |
| Replacement local port | The TCP port that the original local port is replaced with. |
| Replacement remote address | The IP address with which the original remote address is replaced. |
| Replacement remote port | The TCP port with which the original remote port is replaced. |
| IP checksum | The difference in IP checksums between the original and replacement addresses. |
| TCP checksum | The difference in TCP checksums between the original and replacement addressing information. |
| Modification rule used | The modification rule from which the translation table entry was created. |

Addressing information in a TCP packet is modified after the packet is matched to a translation table entry. A TCP packet matches a translation table entry when the addressing information in the translation table entry is the same that in the TCP packet. For matched outbound packets, the source and destination of the packet are changed to the source and destination of the original TCP connection. For matched inbound packets, the source and destination of the packet are replaced with a new source and destination to ensure that the packet is forwarded to the gateway application.

IP fragments which do not have a TCP header do not match any translation table entry. However, a list of packets that have been fragmented is maintained to ensure that all IP fragments have their addresses modified appropriately. Translation table entries maintain state information about the TCP session to which they correspond. When a TCP connection is closed, the translation table entry times out after an appropriate interval.

Translation table entries are created when a TCP SYN packet which is not a duplicate SYN matches a modification rule. The three types of modification rules are NOPROXY, REDIRECT, and MAP rules. The NOPROXY rule prevents a SNAT from modifying incoming TCP packets or IP fragments destined for the SNAT's gateway. Remember that a gateway acts as a client gateway for some TCP connections and a server gateway for other TCP connections. The REDIRECT rule ensures that the SNAT properly modifies all TCP packets or IP fragments sent on an original TCP connection for which the gateway acts as a client gateway. MAP rules ensure that the SNAT properly modifies all TCP packets or IP fragments sent on an original TCP connection for which the gateway acts as a server gateway. Table 2 shows the format of the three different types of rules, an X in the table indicating that a field is used by a particular rule. The fields themselves are described below. Table 3 provides a description of each of the fields.

TABLE 2

SNAT Rule Formats.

| | NOPROXY rule | REDIRECT RULE | MAP RULE |
| --- | --- | --- | --- |
| Physical interface | X | X | X |
| Original remote subnet | | X | X |
| Original remote port | | | X |
| Original remote netmask | X | X | |
| Replacement local port | | X | |
| Replacement remote address | | X | X |
| Replacement remote port | | X | X |
| Connections using rule | | X | X |

TABLE 3

Rule Fields

| Field: | Description: |
|---|---|
| Physical interface | The physical interface to which the rule will be applied. A gateway can be a member of different IP subnets using different physical interfaces and a rule will only apply to one subnet. |
| Original remote subnet | The IP subnet of the host (remote host) with which a local host thinks it has a TCP connection. |
| Original remote port | The TCP port of the remote host. |
| Original remote netmask | The netmask of the original remote subnet. |
| Replacement local address | The IP address with which the original local address is replaced. |
| Replacement local port | The TCP port with which the original local port is replaced. |
| Replacement remote address | The IP address with which the original remote address is replaced. |
| Replacement remote port | The TCP port with which the original remote port is replaced. |
| Connections using rule | The number of TCP connections which are currently having their addressing information changed via the rule. |

Rules are stored in the SNAT module in lists. A separate list is used for each type of rule. A TCP packet matches a rule when the addressing information in the packet corresponds to the addressing information listed in the rule. Preferably, only the first packet (SYN) of a TCP connection is matched to a rule. All other packets are matched to translation table entries. Table 4 shows what fields of a rule must be matched for a TCP packet to match a rule. These fields are similar to, but not the same as, the fields in Table 2. Note that for IP fragments of TCP packets that do not contain a TCP header, TCP ports do not have to be matched for a packet to match a rule.

TABLE 4

Fields Checked by various Rules.

| | NOPROXY rule Incoming | REDIRECT rule Incoming | MAP rule Outgoing |
|---|---|---|---|
| Physical interface | X | X | X |
| Original local address | | | |
| Original local port | | | |
| Original remote subnet | X | X | |
| Original remote port | | | |
| Replacement remote address | | | X |
| Replacement remote port | | | X |

For incoming packets, a test for matching is first performed with NOPROXY rules followed by REDIRECT rules. For outgoing packets, tests for matching are performed with MAP rules. The order of the matching tests for incoming packets is important because packets may match both NOPROXY and REDIRECT rules.

How addressing information in a packet is modified depends on the rule matched. When an incoming TCP SYN packet matches a REDIRECT rule or an outgoing TCP SYN packet matches a MAP rule, a new translation table entry is created. In addition, for the REDIRECT rule, after the translation table entry is created, the original addressing information of the TCP SYN is saved and forwarded to the application gateway when requested, and the replacement local port of the rule is changed.

The replacement local port must be different for every translation table entry that is created from the REDIRECT rule. Otherwise, consider the case when a host uses the same port, for instance, the FTP data port, to connect to two different destinations. The SNAT would send TCP packets from both connections to the same replacement local port on the gateway and the TCP module on the gateway would be unable to handle the data properly. A list of valid replacement local ports is maintained by each REDIRECT rule.

Original addressing information is stored with its replacement addressing information in the translation table entry. When the application sends the SNAT the addressing information it has for a particular client TCP connection which the SNAT recognizes as the replacement addressing information, the SNAT replies with the original addressing information.

The WLP Module

The WLP module used in the preferred GT embodiment is responsible for providing an ordered connection-oriented delivery of packets between the client and server gateways. WLP can support several different types of virtual circuits (VCs), including, but not limited to, unreliable, reliable using ARQ, and reliable using FEC. The type of VC used depends on the characteristics of both the wireless link and the data.

The WLP module also incorporates features that enhance TCP performance and efficiency. In fact, WLP enhances TCP performance even when used outside the scope of the present invention. This is important, as the GT preferred embodiment is unable to split some TCP connections, e.g., where the TCP header cannot be read. While the performance of these connections does not improve to the same extent as connections that are split, they are still enhanced by WLP.

The approach taken is threefold. First, when a new connection is created, get data flowing as quickly as possible. Second, once data starts flowing, prevent TCP's flow control algorithm from reducing the flow. The flow control algorithm will confuse errors with congestion and reduce flow unnecessarily when no congestion exists. Of course, when congestion is present on either the terrestrial or satellite portions of the link, flow is reduced, as it should be. Third, correct errors in as efficient a manner as possible.

These goals are accomplished by using a combination of fragmentation and selective repeat ARQ at the link layer. Fragmentation decouples the TCP segment size from the link layer packet size. This is particularly important for IPSEC, which cannot be split, because the larger the TCP segment size, the quicker the flow control algorithm will inject data into the network. On the other hand, larger packets are more susceptible to errors and result in larger amounts of data being retransmitted when an error does occur. Fragmentation enables transmission of large TCP segments such as IPSEC segments, while at the same time retaining the benefits of smaller link layer packets. Of course, fragmentation is restricted to the wireless segment of the network and is done transparently to IP, in a manner similar to the fragmentation of IP packets into asynchronous transfer mode (ATM) cells for IP/ATM.

Selective Repeat ARQ is used to correct any link errors. Link layer acknowledgments containing the entire state of the receive buffer are periodically sent from the receiver to the sender based perhaps on the number of messages received, or alternatively, on some period of time. Because ACKs are interrupt driven as opposed to data driven, the link layer works well on asymmetric links. Note that TCP ACKs are still data driven, so TCP may still experience asymmetry problems when the connection is not split. When a packet does need to be retransmitted, it is retransmitted several times, typically two or three times, depending on the bit error rate, to ensure that the packet will not need more than a single retransmission. This is a very simple form of FEC, and is important because repeat transmissions typically cause TCP timers to expire, negating any benefit of link layer retransmissions. Selective repeat ARQ results in packets being received out of order. Therefore, packet reordering is performed prior to defragmentation by the receiving link layer process.

For connections which can be split, the WPL module simply provides a reliable connection from one WISE node to its peer node at the other end of the wireless link. For connections that cannot be split, it provides an enhanced link which aids TCP by shielding it from link errors.

The WPL module on one gateway maintains a session with a WPL module on another gateway. In a preferred embodiment, this session is the transport mechanism that is accessed by the gateway application module. More information about WPL can be found in J. S. Stadler, "A Link Layer Protocol for Efficient Transmission of TCP/IP Via Satellite", Milcom 97, Nov. 4, 1997, Monterey, Calif., which is incorporated herein by reference.

Preferred Gateway Application Module

The gateway application is responsible for starting and accepting TCP connections with hosts, for ensuring that gateway applications on other gateways connect to the appropriate hosts, and for maintaining gateway usage fairness among TCP connections. When it is initialized, the gateway application creates a WLP session, tells the SNAT to add NOPROXY and REDIRECT rules, and opens the main socket to listen for incoming TCP connections. A WLP session may be associated with many TCP connections simultaneously. To distinguish one TCP connection from another, the gateway application maintains a virtual circuit (VC) table.

Any time a new client TCP connection is accepted on the main socket by a client gateway, a client VC is created. As a direct result, a server VC is created on the server gateway. Every VC on a gateway has a receiving connection number and a sending connection number which are unique among the gateway's currently operating VCs. A VC's receiving and sending connection numbers are its indices into the receiving and sending sides of the VC table. A client VC is initialized after the application accepts a TCP connection on the main socket. During this initialization, the VC is passed addressing information pertaining to the original TCP connection and a receiving connection number that is retrieved from an available connection number list.

Once this information is passed on a WLP session to an application on the server gateway, a server VC is initialized on the server gateway. In addition to being passed the information sent by the client VC, a server VC is initialized with its own receiving connection number retrieved from an available connection number list. This connection number is sent back to the client VC after the server VC has started a TCP connection with the server.

When both VCs have been initialized and connection numbers have been exchanged, data can be passed between the VCs. Although messages containing data sent between many pairs of corresponding VCs share the same WLP session, the destination VC of each message can be determined because each message contains the receiving connection number of the destination VC. VCs transfer data between TCP connections and a WLP session until a client or server closes its TCP connection. At this point, the VC whose TCP connection was closed tells its corresponding VC to close its TCP connection. Both VCs are removed from the VC table and their receiving connection numbers are placed back on the available connection number list.

Information passes between the two gateway applications connected by a WLP session via VC messages. During framework set up, the messages contain connection numbers and addressing information. While the client and server are communicating with each other, the messages may contain data. DATA messages have actual end user application data. All other messages have only gateway to gateway control information. During framework teardown, the ending of a TCP connection by the client or server, the messages contain the method of the TCP connection ending. Six types of messages are sent on VCs—CONNECT messages, CONN_ACK messages, CONN_NAK messages, DATA messages, DISCONN messages, and DISCONN_ACK messages. Table 5 shows the format of various message types. An X indicates that the message contains a particular field.

TABLE 5

VC Message Formats.

|  | CONNECT | CONN_ACK | CONN_NAK | DATA | DISCONN | DISCONN_ACK |
|---|---|---|---|---|---|---|
| Message type | X | X | X | X | X | X |
| Receiving connection number | X | X |  |  | X |  |
| Sending connection number |  | X | X | X |  | X |
| Local address | X |  |  |  |  |  |
| Remote address | X |  |  |  |  |  |
| Local port | X |  |  |  |  |  |
| Remote port | X |  |  |  |  |  |
| Data length |  |  |  | X |  |  |
| Data |  |  |  | X |  |  |
| Disconnect type |  |  |  |  | X |  |

All messages have a message type. Rather than describing the remaining fields individually, the messages and how the fields apply to them are described below.

CONNECT messages are sent by a client VC after the start of a TCP connection by a client. All of the information in a CONNECT message is copied directly from the client VC that creates it. Upon receipt of a CONNECT message, a server gateway creates a server VC which attempts to connect to the server specified as the remote host in the message.

CONN_ACK messages are sent by a server VC after receipt of a CONNECT message and successful connection to the server specified in the CONNECT message. The sending connection number of the CONN_ACK message is the same as the receiving connection number of the CONNECT message. The receiving connection number of the CONN_ACK message is taken from the server VC. Upon sending a CONN_ACK message, a server VC can transfer data between the server and the client gateway. Upon receiving a CONN_ACK message, a client VC can transfer data between the client and the server gateway.

CONN_NAK messages are sent on a server VC after receipt of a CONNECT message and an unsuccessful attempt to connect to the server specified in the CONNECT message. The sending connection number of the CONN_ACK message is the same as the receiving connection number of the CONNECT message. Upon sending a CONN_NAK message, a server VC is deleted. Upon receiving a CONN_NAK, a client VC is deleted.

DATA messages can be sent on a VC after the VCs have sent or received a CONN_ACK message. A DATA message is formed when a VC receives data on its TCP connection. Data length is the amount of data in bytes read from the TCP connection. Data is the actual data read from the TCP connection. Upon receiving a data message, a VC sends the data on its TCP connection.

DISCONN messages are sent on a VC after the VC's TCP connection has been ended by a host. The receiving connection number of the DISCONN message is the receiving connection number of the VC that sent the message. The disconnect type reflects how the TCP connection was ended. If the connection was ended normally, the disconnect type is set to FIN. If the connection was aborted, the disconnect type is set to RST. Upon sending a DISCONN message, a VC waits for a DISCONN_ACK message.

DISCONN_ACK messages are sent on a VC as a result of the receipt of a DISCONN message. The sending connection number of the DISCONN_ACK message is the receiving connection number specified in the DISCONN message. Upon sending or receiving a DISCONN_ACK message, a VC is deleted.

Throughout its operation, the gateway application communicates with its associated SNAT. Upon initialization, the gateway application tells the SNAT to clear its modification rule lists, its translation table, and its addressing list. Next, the gateway application tells the SNAT to add NOPROXY rules and REDIRECT rules to its modification rule lists. Upon accepting a TCP connection and forming a client virtual circuit, the application asks the SNAT for addressing information. After starting a server virtual circuit but before connecting to a server, the application tells the SNAT to add a MAP rule to its modification rule lists. After closing a virtual circuit's socket but before deleting the virtual circuit, the gateway application tells the SNAT to remove a MAP rule from its modification rule lists. Finally, before stopping, the gateway application tells the SNAT to remove NOPROXY rules and REDIRECT rules from its modification rule lists.

Preferably, the application and SNAT communicate via a form of inter-process communication with messages. The application always sends a message and the SNAT responds with a positive or negative acknowledgment of whether the action specified by the message could be performed correctly. For certain messages, the SNAT also sends information back to the application.

Messages can be broken into three groups—configuration, information, and clean up. Configuration messages sent by the application cause the SNAT to add or remove a modification rule. Information messages sent by the application request information from the SNAT. Clean up messages cause the SNAT to clear all its lists and tables.

ANOPROXY, AREDIRECT, and AMAP are configuration messages that tell the SNAT to add a NOPROXY, REDIRECT, and MAP rule respectively. RNOPROXY, RREDIRECT, AND RMAP are configuration messages which direct the SNAT to remove a NOPROXY, REDIRECT, and MAP rule respectively. GINFO is an information message that asks the SNAT to send the application addressing information pertaining to an original TCP connection. CLEAR is a clean up message that directs the SNAT to clear its lists and table. Table 6 shows the format of various message types, an X indicating that the message contains a particular field. As Table 6 shows, ANOPROXY and RNOPROXY messages have the same fields, AREDIRECT and RREDIRECT messages have the same fields, and AMAP and RMAP messages have the same fields. Table 7 describes each message field of Table 6.

TABLE 6

Application/SNAT Message Formats.

| | ANOPROXY/ RNOPROXY | AREDIRECT/ RREDIRECT | AMAP/ RMAP | GINFO | CLEAR |
|---|---|---|---|---|---|
| Message type | X | X | X | X | X |
| Physical interface | X | X | X | | |
| Original remote subnet | X | X | X | | |
| Original remote port | | | X | | |
| Original remote netmask | X | X | | | |
| Replacement local address | | | | X | |
| Replacement local port | | X | | X | |
| Replacement remote address | | X | X | X | |
| Replacement remote port | | X | X | X | |

TABLE 7

Application/SNAT Message field.

| Field: | Description: |
|---|---|
| Message type | Messages are distinguished from one another by their message type. |
| Physical interface | The physical interface of a modification rule to be added or removed. |
| Original remote subnet | The original remote subnet of a modification rule to be added or removed. |
| Original remote port | The original remote port of a modification rule to be added or removed. |

TABLE 7-continued

Application/SNAT Message field.

| Field: | Description: |
|---|---|
| Original remote netmask | The netmask of the original remote subnet of a modification rule to be added or removed. |
| Replacement local address | For GINFO messages, the replacement local address of a translation table entry. |
| Replacement local port | For configuration messages, the replacement local port of a modification rule to be added or removed. For GINFO messages, the replacement local port of a translation table entry. |
| Replacement remote address | For configuration messages, the replacement remote address of a modification rule to be added or removed. For GINFO messages, the replacement remote address of a translation table entry. |
| Replacement remote port | For configuration messages, the replacement remote port of a modification rule to be added or removed. for GINFO messages, the replacement remote port of a translation table entry. |

The gateway application uses a state machine to maintain both a VC list and a VC table to distinguish one TCP connection from another. Any time a new client TCP connection is accepted by a client gateway on the main socket, a client VC is created. As a direct result, a server TCP connection is eventually started by the server gateway with a server, and a new server VC is created. These two VCs are said to correspond to one another. Each VC has the fields shown on Table 8.

TABLE 8

| Field: | Description: |
|---|---|
| State | The state of the VC. VCs have four states - CONNECTED, CONN_PENDING, DISCONN_PENDING, and DISCONNECTED |
| Local address | The IP address of the host that is on the same subnet as the gateway. If the gateway is acting as a client gateway, then the local IP address would be that of the client. If the gateway is acting as a Server gateway, then the local IP address would be that of the server. |
| Local port | The TCP port that, together with the local address, forms a socket. |
| Remote address | If the gateway is acting as a client gateway, the remote address is the IP address of the server. If the gateway is acting as a Server gateway, the remote address is the IP address of the client. |
| Remote port | The TCP port that, together with the remote address, forms a socket. |
| Receiving connection number | The value that will be in all data messages that the VC receives via the WLP session. |
| Sending connection number | The value that will be in all data messages that the VC sends on the WLP session. |
| Socket | The endpoint of the TCP connection that the gateway has with a host. |
| VC type | A flag indicating whether the circuit is a client circuit or a server circuit. |

Once a VC has been formed, the VC type distinguishes a client VC from a server VC. For server VCs, the gateway application must tell the SNAT to remove a MAP modification rule once the circuit has been deleted.

Every VC has a receiving connection number and a sending connection number. The receiving connection number of a client VC will be the sending connection number of the corresponding server VC and vice versa. The two connection numbers of a VC are its indices into the VC table which has a receiving side and a sending side. All data messages received on a WLP session have a connection number that is the index in the VC table of the VC that the data is being sent to. A VC is responsible for choosing its own receiving connection number. In the same light, a VC is told by its corresponding VC what its sending connection number will be. Receiving connection numbers are chosen from the front a receiving connection number list that is formed when the application is started.

Client VCs are initialized in the CONN_PENDING state with local and remote addressing information, a receiving connection number, a socket, and their VC type set to Client. The socket is the endpoint of the TCP connection between the client and client gateway. The local addressing information is the client address and port of the original TCP connection and is retrieved from the SNAT. The remote addressing information is the server address and port of the original TCP connection and is also retrieved from the SNAT. The receiving connection number is taken from the front of the free receiving connection number list and removed from the list. A client VC finds out what its sending connection number is from the server gateway.

Server VCs are initialized in the CONN_PENDING state with local and remote addressing information, a receiving connection number, a sending connection number, and their VC type set to Server. The local addressing information is the server address and port of the original TCP connection and is sent by the client gateway. The remote addressing information is the client address and port of the original TCP connection and is sent by the client gateway. The sending connection number is also sent by the client gateway. The receiving connection number is chosen from the front of the free receiving connection number list (and is removed from the list). The socket field of a server VC is not assigned until after the server gateway has successfully set up a TCP connection with the server.

After initialization, the VC is placed in the VC table and on the VC list. In a round robin fashion, the gateway application reads data from sockets belonging to CONNECTED VCs on the list. In this manner, fairness is assured. Note that alternative modes of fairness could easily be supported by varying the manner in which data is read from the open sockets. This allows users to define fairness according to criteria such as cost, e.g., users paying for premium service would have a higher priority.

VCs transfer data between sockets and the WLP session until the host closes the TCP connection or a message is received on the VC telling the application to close the TCP connection. Upon either of these events occurring, the VC will be deleted. When the VC is deleted, its socket is closed, it is removed from the VC table and VC list and its receiving connection number is placed at the end of the free receiving connection number list.

Information passes between the two gateways that a WLP session connects via VC messages as described in Table 5.

CONNECT messages are sent on a client VC after it is initialized due to the start of a TCP connection by a client. All of the information in a CONNECT message is taken directly from the client VC that created it. Upon sending a CONNECT message, (i.e., just after it is initialized), a client VC enters the CONN_PENDING state. Upon receipt of a CONNECT message, a server VC enters the CONN_PENDING state and attempts to connect to the server specified as the remote host in the message.

CONN_ACK messages are sent on a server VC as a result of the receipt of a CONNECT message and the successful connection to the server specified in the CONNECT message. The sending connection number of the CONN_ACK message is the same as the receiving connection number of the CONNECT message. The receiving connection number of the CONN_ACK message is taken from the server VC. Upon sending a CONN_ACK message, a server VC enters the CONNECTED state. Upon receiving a CONN_ACK message, a client VC enters the CONNECTED state.

CONN_NAK messages are sent on a server VC as a result of the receipt of a CONNECT message and the unsuccessful connection to the server specified in the CONNECT message. The sending connection number of the CONN_ACK message is the same as the receiving connection number of the CONNECT message. Upon sending a CONN_NAK message, a server VC is deleted and enters the DISCONNECTED state. Upon receiving a CONN_NAK, a client VC is deleted and enters the DISCONNECTED state.

DATA messages are sent on VCs after the VCs have entered the CONNECTED state. A DATA message is formed when a VC receives data on its socket. Data length is the amount of data in bytes read from the socket. Data is the actual data read from the socket. Upon receiving a data message, a VC sends the data on its socket.

DISCONN messages are sent on VCs after the VC's socket TCP connection has been ended by a host. The receiving connection number of the DISCONN message is the receiving connection number of the VC that sent the message. The disconnect type reflects how the TCP connection was ended. If the connection was ended normally, the disconnect type is set to FIN. If the connection was aborted, the disconnect type is set to RST. Upon sending a DISCONN message, a VC enters the DISCONN_PENDING state. DISCONN messages are also sent in response to the receipt of an invalid VC message. In such a case, the disconnect type is set to INVALID.

DISCONN_ACK messages are sent on VCs as a result of the receipt of a DISCONN message. The sending connection number of the DISCONN_ACK message is the receiving connection number specified in the DISCONN message. Upon sending a DISCONN_ACK message, a VC is deleted and enters the DISCONNECTED state. Upon receiving a DISCONN_ACK message, a VC is deleted and enters the DISCONNECTED state.

Figure 13:
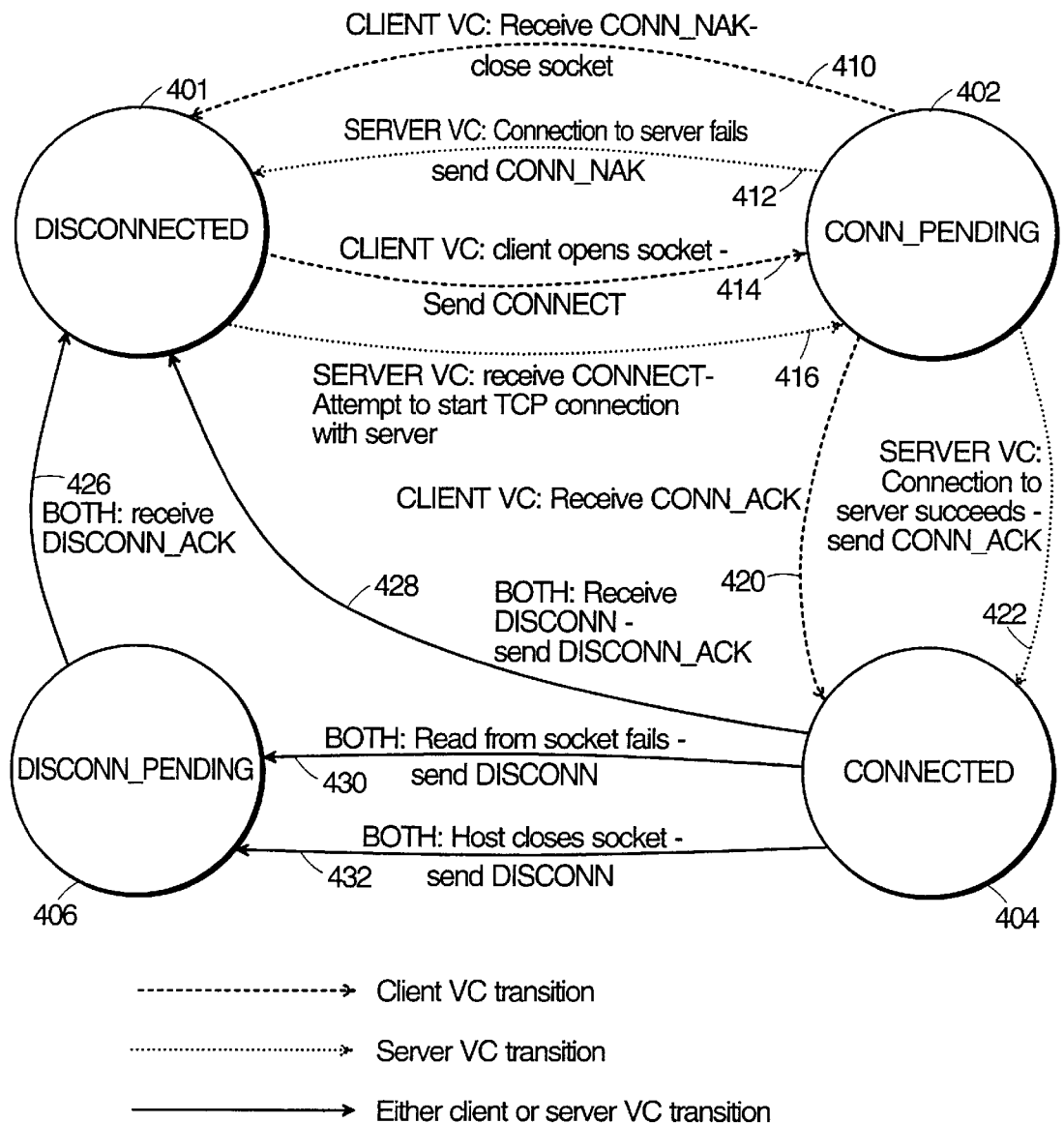
FIG. 13 is a state diagram illustrating the states and state changes of an alternate embodiment of the present invention.

FIG. 13 is a state diagram illustrating the four VC states—DISCONNECTED 401, CONN_PENDING 402, CONNECTED 404, and DISCONN_PENDING 406, although technically, an existing VC is never actually in the DISCONNECTED state 401. This state is entered only after a VC has been deleted or before a VC has been initialized. A VC enters the CONN$_{13}$ PENDING 402 state after it has been initialized but before the GT framework has been set up. While the VC is transferring data between a socket and the WLP session, it is in the CONNECTED state 404. The DISCONN_PENDING state 406 is entered by a VC after its socket has been closed but before the GT framework has been torn down.

The natural sequence of states for a VC is from DISCONNECTED 401 to CONN_PENDING 402 to CONNECTED 420, and then either to DISCONN_PENDING 426 followed by DISCONNECTED 401, or directly to DISCONNECTED 401. The format of the transition explanations are:

<VIRTUAL CIRCUIT TYPE>: <cause of transition>— <Action taken following transition>

A client gateway application enters the CONN_PENDING state 402 when the client opens a socket (step 414). The client gateway application sends a CONNECT message to the server gateway application. Upon receipt of the CONNECT message, the server gateway application enters the CONN_PENDING state 402 and attempts to start a TCP connection with the server (step 416). If this attempt to connect to the server fails, the server reverts to the DISCONNECTED state 401 and sends a CONN_NAK message back to the client gateway application (step 412). Upon receipt of the CONN_NAK message, the VC reverts to the DISCONNECTED state and closes the socket (step 410).

On the other hand, if the connection to the server succeeds, the server VC enters the CONNECTED state 404 and sends a CONN_ACK message to the client gateway application (step 422). Upon receipt of the CONN_ACK message, the client VC enters the CONNECTED state 404 (step 420). The connection is now complete and data may be passed back and forth.

If either gateway application is not able to read from its associated socket, the VC of the gateway application experiencing the failure enters the DISCONN_PENDING state 406 and sends a DISCONN message to the other gateway application (step 430). The VC of a gateway application which receives a DISCONN message transitions directly to the DISCONNECTED state and sends a DISCONN_ACK message back to the first gateway application (step 428). Upon receipt of the DISCONN_ACK message, the first VC returns to the DISCONNECTED state 401 (step 426).

On the other hand, if either host (client or server) closes the socket to its associated gateway application, the respective VC enters the DISCONN_PENDING state 406 and a DISCONN message is sent to the other gateway application (step 432). As before, the other gateway application's VC, upon receiving the DISCONN message, transitions directly to the DISCONNECTED state and sends a DISCONN_ACK message back to the first gateway application (step 428). Upon receipt of the DISCONN_ACK message, the first VC returns to the DISCONNECTED state 401 (step 426).

Transitions due to invalid VC messages being received are not shown in FIG. 13. When an invalid VC message is received, a DISCONN message is sent with the disconnect type set to INVALID. The VC ends its TCP connection and is deleted.

The gateway application/SNAT messages are the same as for the preferred embodiment as previously described in Tables 6 and 7.

Detailed Example

Figure 14:
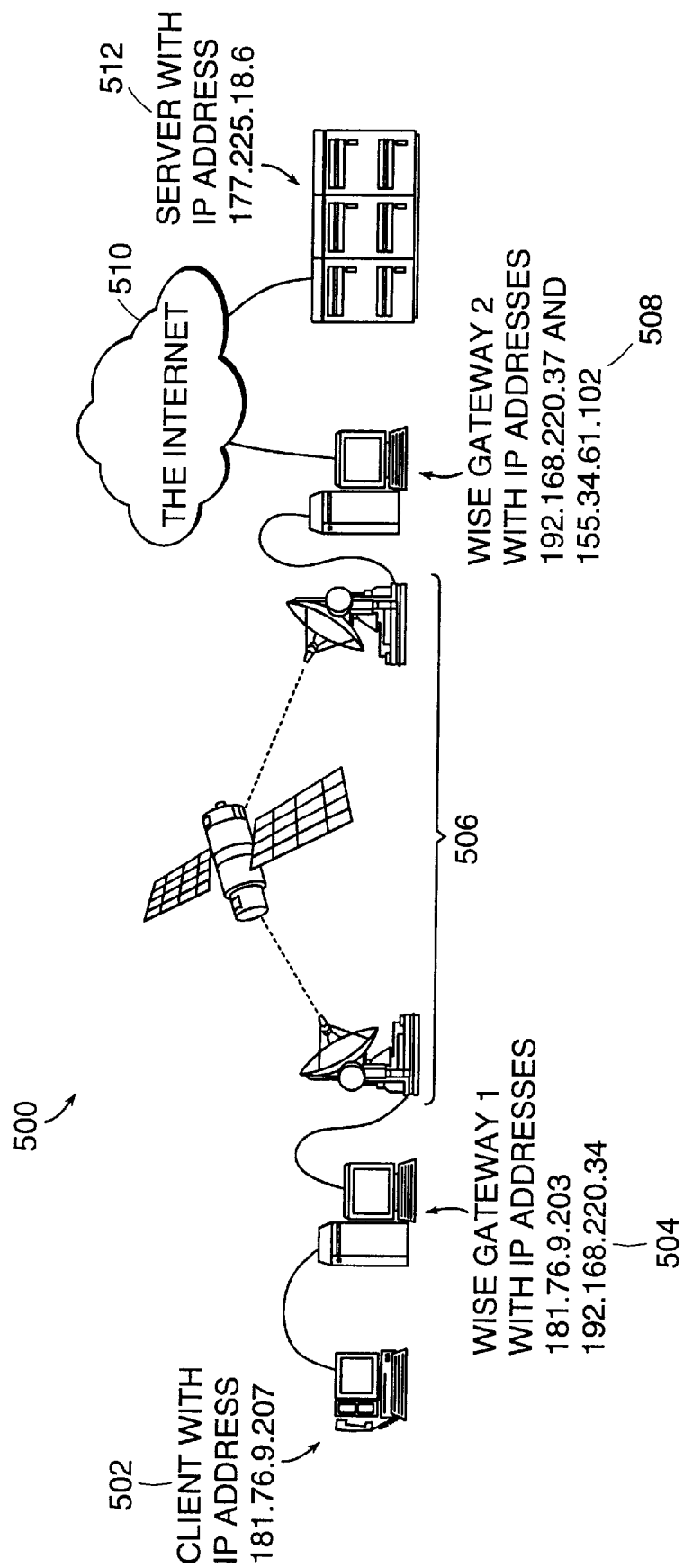
FIG. 14 is a block diagram used to illustrate a detailed example of a preferred embodiment of the present invention.

FIG. 14 illustrates a sample system 500 which provides the basis for a discussion of a detailed example showing how a particular FTP session works with the implementation described. A client system 502 is attempting to communicate with a server which is available over the Internet 510. The client is connected to client gateway 504, which communicates with the server gateway 508 over a satellite link 506 or other high delay-bandwidth link. The server gateway 508 is also connected to the Internet 510 and is able to communicate with the server over the Internet 510.

As is standard for the Internet, each gateway has two (or more) Internet addresses, one for each interface. For example, the client gateway 502 has an Internet address of 181.76.9.203 when looking to the client 502, and an Internet address of 192.168.220.34 when looking to the server gateway 508 over the satellite link 506.

When the gateway application on the client gateway 502 is started, it opens a socket on address/port 181.76.9.203/ 6001 and sends messages to its SNAT requesting that the SNAT create the following rules:

Rule 1: NOPROXY for subnet 192.168.220.32 netmask 255.255.255.240 on interface le1

Rule 2: NOPROXY for subnet 181.76.9.0 netmask 255.255.255.0 on interface le1

Rule 3: REDIRECT for subnet 0.0.0.0 netmask 0.0.0.0 to address 181.76.9.203 port 6001 on interface le1

When the gateway application on the server gateway 508 is started, it opens a socket on address/port 155.34.61.102/6001 and sends messages to its SNAT requesting that it create the following rules:

Rule 1: REDIRECT for subnet 181.76.9.0 netmask 255.255.255.0 to address 155.34.61.102 port 6001 on interface le1

The gateways 504, 508 are now set up.

Assume that the client 502, which in this example, has an Internet address of 181.76.9.207, wants to use FTP to retrieve a file from the server 512, which in this example has an Internet address of 177.225.18.5. The client 502 starts up an FTP program which directs TCP to connect to the server's port 21. A TCP SYN packet having a source address/port of 181.76.9.207/33408 and a destination address/port of 177.225.18.5/21 is received on the client gateway 504 interface le1, the interface to which IP address 181.76.9.203 is connected.

The client gateway 504 SNAT matches the packet to its Rule 3, described above, by ANDing the destination address of the packet, 177.225.18.5, with the rule's netmask 0.0.0.0. The result is 0.0.0.0, which matches the rule's subnet. The SNAT then creates a translation table entry for the connection, changes the destination address/port to 181.76.9.203/6001, changes the source port to 32001, and passes the packet up to the IP layer.

Because the destination addressing information has been changed to that of the client gateway application, the packet eventually reaches the client gateway application, which accepts the connection from the client and starts a client VC. Meanwhile, the TCP three-way handshake, comprising a SYN from the client 502, a SYN/ACK returned from the client gateway 504, and an ACK from the client 502, will have taken place. The client gateway application sends its SNAT a GINFO message requesting destination addressing information for the connection started from 181.76.9.207/32001 (remember that the local port was changed from 33408 to 32001), and the SNAT responds with the information. The client gateway application sends a CONNECT message to the server gateway 508 application with the following information:

Receiving connection number: 1
Local address: 181.76.9.207
Remote address: 177.225.18.5
Local TCP port: 33408
Remote TCP port: 21

The gateway application on the server gateway 508 receives the CONNECT message and starts a server VC. It opens a socket on 155.34.61.102/32008, and sends a message telling its SNAT to add the following rule:

Rule 2: MAP 155.34.61.102/32008 to 181.76.9.207/33408 on interface le1

After the rule is added, the server gateway application attempts to connect to 177.225.18.5/21. An outgoing TCP SYN packet with source 155.34.61.102/32008 and destination 177.225.18.5/21 reaches the server gateway 508 SNAT and is matched to its new Rule 2. The SNAT changes the source to 181.76.9.207/33408, creates a translation table entry for the connection, and sends the packet out the server gateway's 508 interface le1. The connection is successfully made and the server gateway 508 application sends a CONN_ACK message with the following information, back to the client gateway 504 application:

Sending connection number: 1
Receiving connection number: 5

TCP packets are then sent back and forth until either the client 502 or server 512 ends the connection. For the FTP session, other TCP connections are started and ended, and MAP rules are added and removed dynamically. For FTP, the last connection ended is always the control connection, i. e., the first connection started. At some point, the FTP client may send the FTP server a PORT command, perhaps telling it to send TCP packets to 181.76.9.207/33409. No special processing need occur for this PORT command. It can be treated like any other packet because the SNAT modules do not care what source and destination packets contain. They simply follow the modification rules.

Rather than describing the entire FTP session, we assume that it proceeds properly, DATA packets flow back and forth, and eventually the client closes the control connection. When this occurs, a TCP FIN packet having a source of 181.76.9.207/33408 and a destination of 177.225.18.5/21 arrives at the client gateway 504. The client gateway 504 SNAT module matches the packet to a translation table entry, changes its destination address and sends it to the IP module. Eventually, the packet reaches the client gateway application, which sends a DISCONN message to the gateway application on the server gateway 508, containing the following information:

Receiving connection number: 1
Disconnect type: FIN

The gateway application on the server gateway 508 receives the DISCONN message, closes the socket which it had opened to the server 510, and deletes the server VC from its tables. It also starts a timer which eventually removes its SNAT's Rule 2. Before deleting the server VC, the application sends a DISCONN_ACK message to the client gateway 504 containing the following information:

Sending connection number 1

The gateway application on the client gateway 504 receives the DISCONN_ACK message and deletes the client VC. The FTP session has successfully been completed. The translation table entry on the client gateway 504 for the session eventually times out, and the translation table entry on the server gateway 508 for the session is removed when the MAP rule is removed.

Results

Testing of the present invention was performed on Sparc Ultra 1 computers running Solaris 2.5. The TCP implementation used on these machines was the Solaris 2.5 TCP module. A satellite channel with a round trip delay of 1 second and a bit error rate of $10^{-5}$ was simulated via kernel modules located on the computers. Independent errors were used. Satellite channels having forward and reverse bandwidths of 100 Kbps were provided. The maximum segment size of the TCP modules was set to 250 bytes, the value that produces the highest utilization for a bit error rate of $10^{-5}$.

Figure 15A:
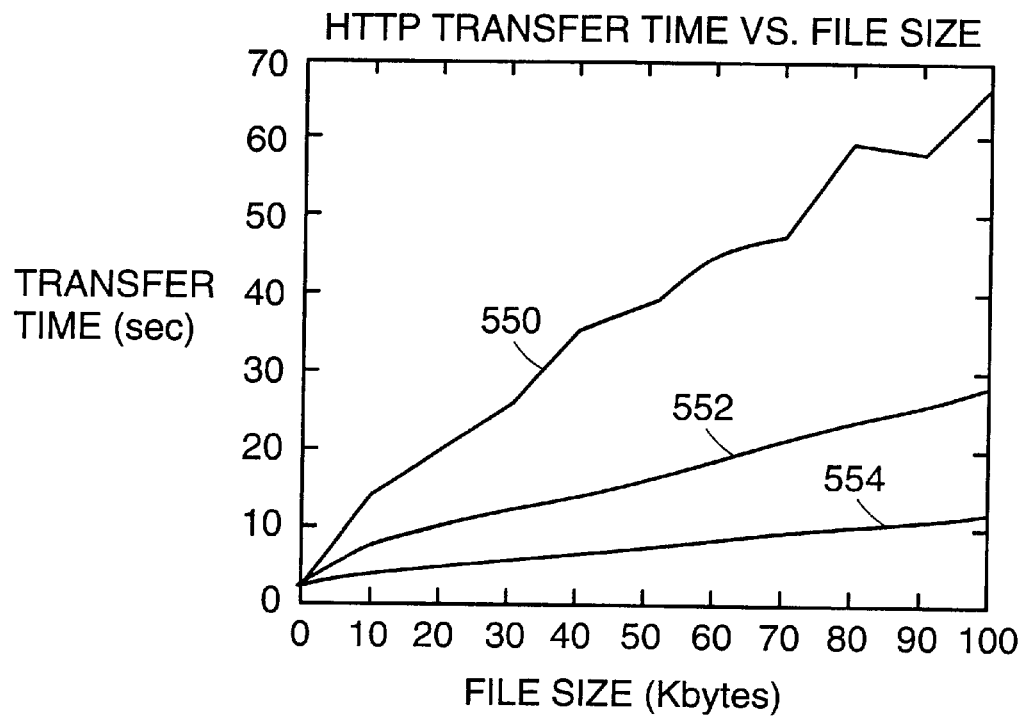
FIGS. 15A and 15B are graphs illustrating comparative HTTP transfer times and HTTP link utilization respectively.
Figure 15B:
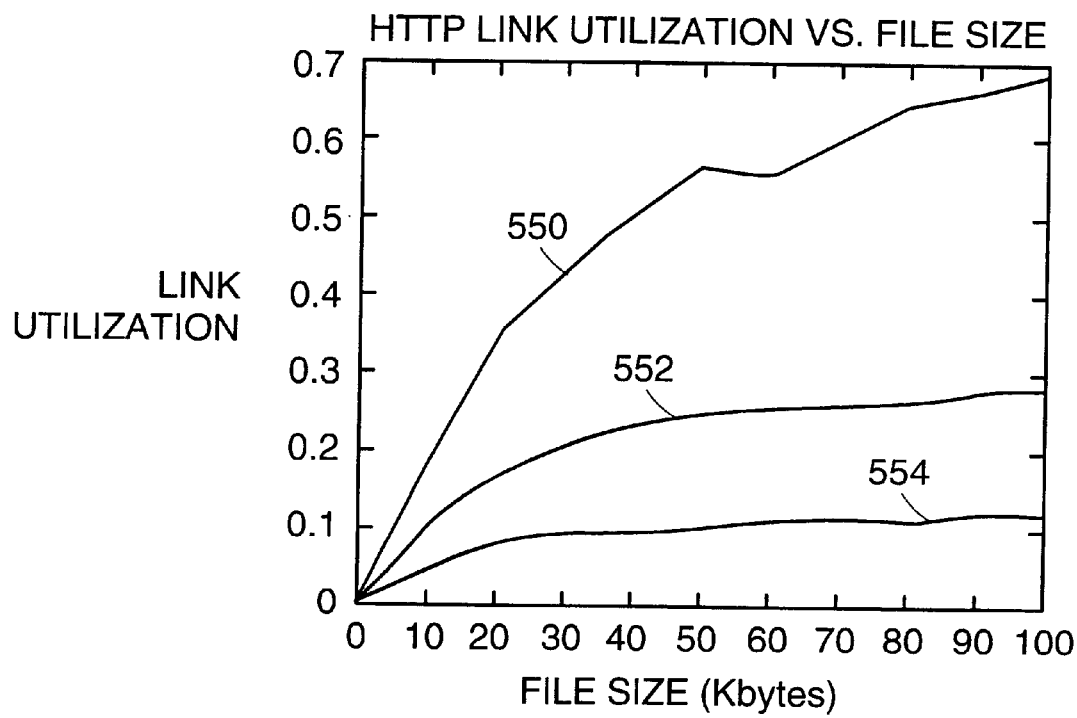

For HTTP tests the size of the transfer was varied from 0 to 100,000 bytes. Twenty transfers were performed at each file size to insure accurate results. Transfer times are shown in FIG. 15A and link utilization is shown in FIG. 15B.

Three different protocol setups are shown—TCP 550, TCP running on top of WLP 552, and the present invention 554. For files of all sizes, the present invention 554 performed best and TCP alone 550 performed worst. Since two round trips are needed for connection setup and HTTP file requesting, the time to transfer files of size 0 (the overhead time) is about 2 seconds for all three setups. The overhead time effects link utilization also. If overhead time were not included in the calculation of link utilization, link utilization for preferred embodiment of the present invention would be approximately 100% for all HTTP transfers.

Figure 16A:
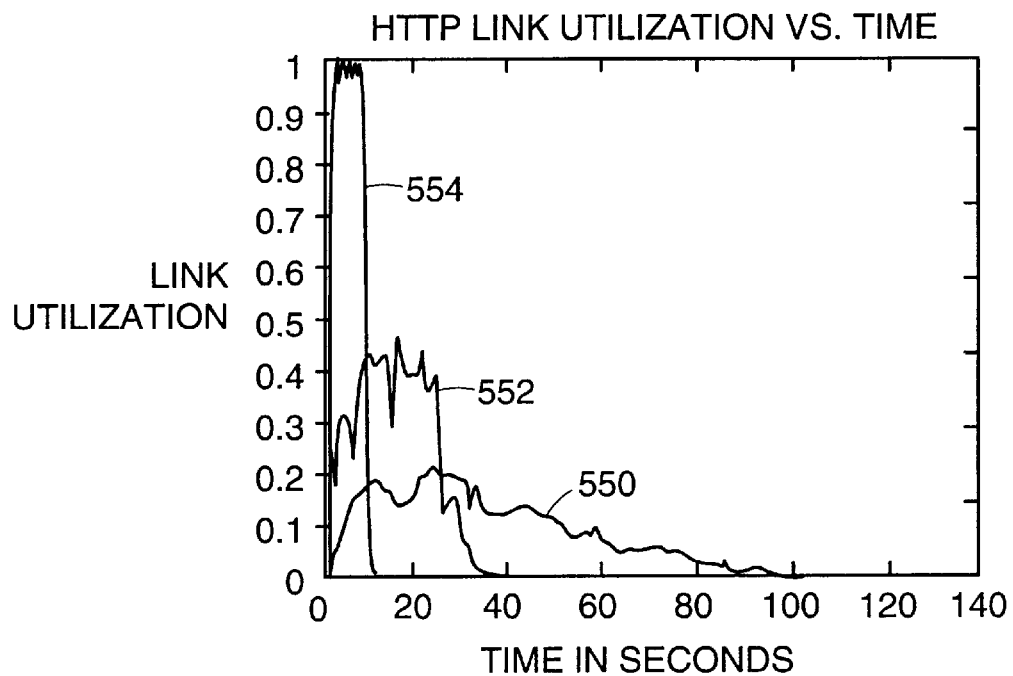
FIGS. 16A and 16B are graphs illustrating comparative instantaneous link utilization for one and five HTTP transfers respectively.
Figure 16B:
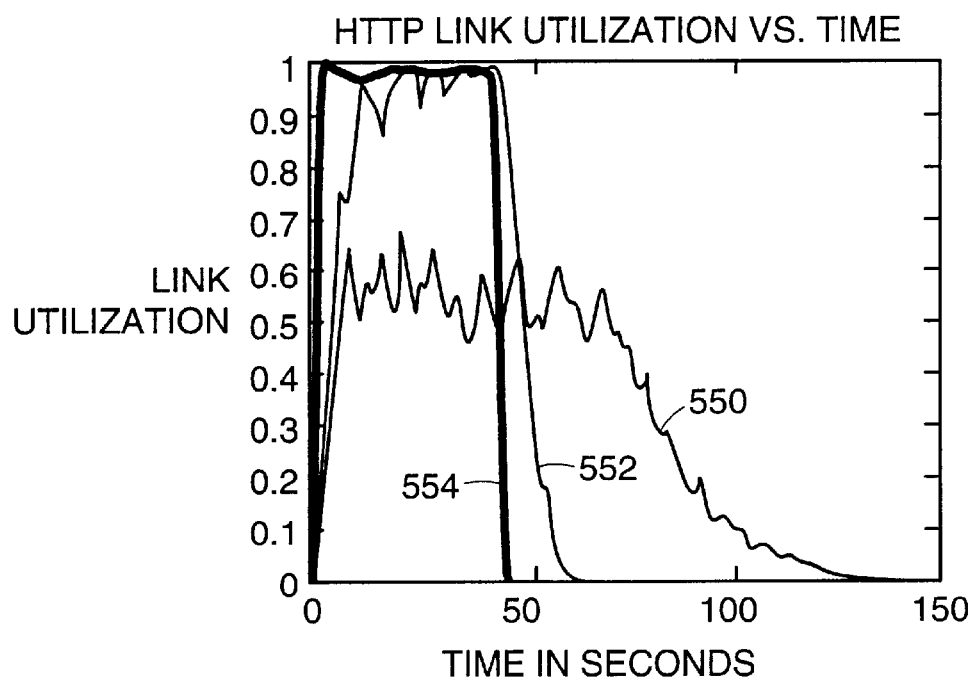

Tests were also performed that measured instantaneous link utilization for 1 HTTP transfer of a 100,000 byte file and 5 simultaneous HTTP transfers of 100,000 byte files. The results are shown in FIGS. 16A and 16B.

Again, the present invention 554 performed best and TCP alone 550 performed worst. Link utilization for the present invention jumps to 100% after the initial overhead time. While the performance of the present invention is significantly better than TCP on top of WLP 552 for one transfer, the difference in performance is not as noticeable for five simultaneous transfers. TCP's slow start mechanism prevents TCP on top of WLP from ramping up quickly as the preferred embodiment does. For five simultaneous transfers, however, slow start is not very noticeable because the 100 Kbps link becomes fully loaded much more quickly than for one transfer. Once fully loaded, the link stays fully loaded for TCP on top of WLP 552, because WLP provides an error-free data stream to TCP, and TCP's congestion control algorithms never kick in.

In contrast, TCP alone 550 suffers from both slow start and the flow cutbacks that result when errors are encountered on the link and performs badly for both one transfer and five simultaneous transfers. One item worth noting in FIG. 16B is the difference in the trailing edges of the preferred embodiment 554 and TCP on top of WLP 552 curves. The sloping of the trailing edge of the TCP on top of WLP 552 curve is also indicative of the fact that when one transfer ends, other transfers will take a long time to fully utilize the bandwidth that has been freed up. When one of the transfer on the WISE system ends, the other transfers will immediately use the freed bandwidth.

Other Applications

The present invention was developed specifically to enhance the performance of TCP on a wireless link. However, its flexibility lends it to other applications as well. The general framework can be used as a generic protocol converter, allowing many different protocols to be converted among each other. In addition, the approach of the present invention can lead to a very flexible network firewall design. Each of these applications is discussed further below.

Non-TCP Protocol Conversion

While the present invention was developed primarily to convert TCP to WLP for use on wireless channels, it may be configured to convert among many different protocols. The present invention is most useful when a first protocol is translated to a second protocol to allow transmission on an intermediate network, and then converted back to the first protocol. An example is the translation of TCP to WLP and back to TCP described above. For this type of scenario, the only limitation on the protocols involved is that they may be terminated at the gateway by using SNAT and that the gateways understand how to locate the peer gateways on the intermediate network.

A second type of protocol conversion involves conversion from a first protocol to a second protocol without converting back to the first. In this case, it is necessary for the gateway to be able to understand the routing of both networks and that it be capable of translating from one to the other.

Firewalls

Application layer firewalls are special types of protocol converters that convert from protocol A back to protocol A while performing some type of authentication and or filtering of the data the transits the connection. As such, the present invention allows for some very flexible firewall implementations to be constructed. Most available application layer firewalls are Non-Generic/Non-Transparent or are Generic Transparent but require modified applications. The present invention allows true Generic/Transparent firewalls to be constructed that require no modifications to the client applications.

In addition, Generic/Non-transparent and Non-generic/Transparent firewalls may also be constructed. Firewalls built from the present invention may perform standard firewall access restrictions, packet filtering, logging, and attack warning in the new configurations. They may also provide services not usually available, such as user priority access. They can also be used to enable a private network to private network extension through the Internet using encryption to keep the private data secure.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of communicating over a link, comprising:
   receiving, at a source gateway, incoming packets directed to a destination address, in a first protocol;
   at the source gateway, modifying the destination address to that of a source gateway application, the packets being forwarded to the source gateway application in the first protocol;
   upon receipt of a first of the packets at the source gateway application, forwarding original source and destination address information of said packet to a destination gateway application;
   at the destination gateway application, storing the forwarded original source and destination address information, and associating a channel identifier with said address information;
   from the source gateway application, forwarding the packets in a second protocol over the link to the destination gateway application, address information being removed from the packets and the associated channel identifier being appended to the packets;
   forwarding the packets from the destination gateway application to the destination address, based on the stored address information associated with the appended channel identifier; and
   restoring the original source address to the packets forwarded from the destination gateway application, based on the stored address information.

2. The method of claim 1 wherein packets are forwarded from the destination gateway application to the destination address in the first protocol.

3. The method of claim 1, wherein the step of forwarding the packets over the link further comprises:
   in the source gateway application, fragmenting a forwarded packet in the first protocol into smaller packets in the second protocol for transmission over the link to maintain a low susceptibility to transmission errors; and in the destination gateway application, reconstructing the fragmented packet from the smaller packets.

4. The method of claim 3 further comprising:
in the second protocol, upon an automatic repeat request from the destination gateway application to the source gateway application, retransmitting from the source gateway application only packets which are incorrectly received by the destination gateway application, wherein the packets may arrive at the destination gateway application in scrambled order relative to an original order; and
reordering, in the destination gateway application, the received packets into the original order in which they were received from the source.

5. The method of claim 3 wherein an incorrectly received packet is retransmitted a number of times, the number of retransmissions depending on link bit error rate to insure that the packet is correctly received within one round trip time.

6. The method of claim 1 wherein the first protocol comprises transmission control protocol (TCP) over Internet protocol (IP).

7. The method of claim 6 further comprising the step of terminating a TCP connection at the source gateway, wherein acknowledgments are transmitted from the source gateway back to a source.

8. The method of claim 6 further comprising:
in the second protocol, upon an ARQ (automatic repeat request) from the destination gateway application to the source gateway application, retransmitting from the source gateway application only packets which are incorrectly received by the destination gateway application, wherein the packets may arrive at the destination gateway application in scrambled order relative to an original order; and
reordering, in the destination gateway application, the received packets into the original order in which they were received from the source.

9. The method of claim 8 wherein an incorrectly received packet is retransmitted a number of times, the number of retransmissions depending on the link bit error rate to insure that the packet is correctly received within one round trip time.

10. The method of claim 1 wherein the link is a high delay-bandwidth link.

11. The method of claim 10 wherein the high delay-bandwidth link is a satellite link.

12. The method of claim 11 wherein the satellite link provides a connection between TCP nodes using a non-TCP protocol.

13. The method of claim 1, wherein the step of forwarding to the source gateway application comprises replacing the destination address in a received packet with an address of the source gateway application.

14. The method of claim 13, wherein the step of forwarding to the source gateway application further comprises, at the destination gateway application, restoring the original destination address.

15. The method of claim 10, further comprising:
sending acknowledgments over the high delay-bandwidth link only periodically to reduce acknowledgment traffic.

16. The method of claim 15, wherein only a list containing the first sequence number and the last sequence number of a series of contiguously received packets is sent back to the source gateway application.

17. The method of claim 1 wherein a gateway application serves as a transparent proxy.

18. The method of claim 1 wherein a gateway application serves as a firewall.

19. A system of communicating over a link, comprising:
a source gateway which receives, in a first protocol, incoming packets directed to a destination address, modifies the destination address and forwards the packets in the first protocol;
a source gateway application which receives the forwarded packets, establishes a connection over the link, using a second protocol, with a destination gateway application, forwards packet addressing information to the destination gateway application, and further forwards the packets, without the packet addressing information, in the second protocol over the link; and
a destination gateway application which receives the forwarded packets over the link, restores the packet addressing information to the packets and further forwards the packets to the destination address.

20. A system of communicating over a link, comprising:
a source gateway at a first end of the link, which receives incoming packets from a source, the packets being in a first protocol, each incoming packet comprising an original source address and an original destination address;
a source address translator on the source gateway, the source address translator
replacing the original destination address with an address of a source gateway application, the packet being redirected to the source gateway application, and
forwarding the original destination address to the source gateway application;
said source gateway application, executing on the source gateway; a destination gateway at a second end of the link;
a destination gateway application, which executes on the destination gateway, the source and destination gateway applications establishing a connection over the link using a second protocol which ensures that the link is error-free and ordered, to communicate from the source gateway application to the destination gateway application,
the original destination address upon receipt of a first packet from the source to the destination, and
packet data, source and destination addresses having been removed from the packets,
the destination gateway application
forwarding the original source address received from the source gateway application to a destination address translator, and
forwarding the packets to the original destination address using the first protocol, according to which the address of the destination gateway application is appended to the packets as a source address; and
said destination address translator on the destination gateway which replaces the destination -gateway application's address in the packets with the original source address.

21. A method for transparently improving the performance of network applications over a transmission medium, comprising:
receiving, at a first gateway, a request for a communications session sent-by a first end-user to a second end-user in a first protocol;
at the first gateway, modifying the original addressing information of the first protocol to cause the request to be processed by the first gateway;

at the first gateway, establishing, with the first end-user, a first communications session utilizing the first protocol;

at the first gateway, establishing, with a second gateway, a second communications session utilizing a second protocol, wherein the second communications session is over the transmission medium, and, responsive to the request, forwarding addressing information for the requested communications session to the second gateway;

at the second gateway, establishing, with the second end-user, a third communications session utilizing the first protocol;

at the second gateway, restoring the request's original addressing informnation;

on the first communications session, forwarding packets from the first end-user to the first gateway, and restoring original addressing information on and forwarding packets from the first gateway to the first end-user, using the first protocol and modifying addressing information when necessary;

on the second communications session, forwarding packets from the first gateway to the second gateway, and from the second gateway to the first gateway, using the second protocol, the packets having had addressing information removed; and on the third communications session, restoring original addressing information on and forwarding packets from the second gateway to the second end-user, and forwarding packets from the second end-user to the second gateway, using the first protocol and modifying addressing information when necessary.

22. The method of claim 21 wherein the first protocol comprises the Transmission Control Protocol (TCP) over the Internet Protocol (IP).

23. The method of claim 21 wherein forwarding packets sent from the first end-user to the first gateway further comprises changing their addressing information to that of the first gateway.

24. The method of claim 23 wherein the addressing information is changed by an address translation module running on the first gateway.

25. The method of claim 24, further comprising the steps of:

receiving, at the address translation module, an incoming packet which is destined for the second end-user;

checking a list of rules to determine whether the addressing information in the incoming packet needs to be changed;

modifying the addressing information if a rule is matched; and storing the original addressing information of the packet.

26. The method of claim 24 wherein the first protocol comprises the Transmission Control Protocol (TCP) over the Internet Protocol (IP).

27. The method of claim 26 wherein the address translation module is inserted into a protocol stack of the first gateway below an IP module and is configured to change source IP address and TCP port, destination IP address and TCP port, and TCP and IP checksums of the packets.

28. The method of claim 27, wherein the address translation module is configured by a protocol translator running on the first gateway.

29. The method of claim 27, wherein the address translation module changes the addressing information of packets sent to particular TCP ports at the second end-user.

30. The method of claim 21, wherein a protocol translator on the first gateway receives packets via the first communications session and sends them over the second communications session.

31. The method of claim 30, further comprises the steps of:

receiving, at the protocol translator, a start of the first communications session;

sending, from the protocol translator, a message requesting from the address translation module on the first gateway, addressing information of the second end-user;

establishing a second communications session with a second gateway and sending the addressing information of the first and second end-users to the second gateway;

receiving data packets on the first communications session, processing the packets, and sending the packets on the second communications session; and receiving data packets on the second communications session, processing the packets, and sending the packets on the first communications session.

32. The method of claim 31 wherein processing comprises any or all of data compression, data decompression, encryption, decryption, prioritization and billing.

33. The method of claim 31 wherein the protocol translator receives all packets modified by the address translation module on one particular TCP port.

34. The method of claim 21 wherein a second protocol translator on the second gateway receives packets via the second communications session and sends them on the third communications session.

35. The method of claim 34 further comprising the steps of:

on the second communications session, receiving, at the second protocol translator, the original addressing information of the first and second end-users;

opening a new socket to a new TCP port that will be used to communicate with the second end-user;

sending, from the second protocol translator, a message informing a second address translation module on the second gateway that the source addressing information of packets sent from the new socket should be changed to that of the first end-user;

establishing a third communications session between the second protocol translator and the second end-user;

receiving data packets on the second communications session, processing the packets, and sending the packets on the third communications session; and receiving data packets on the third communications session, processing the packets, and sending the packets on the second communications session.

36. The method of claim 35 wherein processing comprises any or all of data compression, data decompression, encryption, decryption, prioritization and billing.

37. The method of claim 21 wherein the second protocol is non-TCP.

38. The method of claim 21 wherein the second session uses a reliable, connection-oriented link layer.

39. The method of claim 38, further comprising, at the link layer:

fragmenting an original packet into smaller packets; and recomposing the smaller packets into the original packet.

40. The method of claim 38, further comprising, at the link layer, using an automatic repeat request (ARQ) algorithm to maintain reliability.

41. The method of claim 40 wherein the ARQ algorithm is such that an ARQ sender conveys its entire receive buffer state to an ARQ receiver.

42. The method of claim 40 wherein the ARQ algorithm determines whether to send an ARQ message based on sequence numbers of messages received.

43. The method of claim 40 wherein the ARQ algorithm determines whether to send an ARQ message based on a period of time.

44. The method of claim 38 wherein the link layer maintains one receive buffer for all sessions between the first gateway and the second gateway.

45. The method of claim 21 wherein only packets using the first protocol have their addressing information changed.

46. The method of claim 21 wherein forward and return paths of the second communications session use different physical networks and/or physical media.

47. The method of claim 21 wherein an end-user and its associated gateway are the same computer.

48. The method of claim 21 wherein the transmission medium is wireless.

49. A method for improving the performance of network applications over a transmission medium, comprising:

receiving, at a first gateway, a request for a communications session sent by a first end-user to a second end-user in a first protocol;

at the first gateway, establishing with the first end-user, a first communications session utilizing the first protocol;

at the first gateway, establishing with a second gateway, a second communications session utilizing a second protocol, wherein the second communications session is over the transmission medium, and responsive to the request, forwarding addressing information of the requested communications session to the second gateway;

at the second gateway, establishing, with the second end-user, a third communications session utilizing the first protocol;

on the first communications session, forwarding packets from the first end-user to the first gateway, and restoring original addressing information on and forwarding packets from the first gateway to the first end-user using the first protocol;

on the second communications session, forwarding packets from the first gateway to the second gateway, and from the second gateway to the first gateway using the second protocol, the packets having had addressing information removed; and on the third communications session, restoring original addressing information on and forwarding packets from the second gateway to the second end-user, and from the second end-user to the second gateway using the first protocol.

50. The method in claim 49 wherein the first protocol comprises the Transmission Control Protocol (TCP).

51. The method in claim 49 wherein the second protocol is non-TCP.

52. The method of claim 49 wherein a protocol translator on the first gateway receives packets via the first communications session and sends the packets on the second communications session.

53. The method of claim 52, further comprising the steps of:

receiving, at the protocol translator, the start of the first communications session;

establishing a second communications session with a second gateway and sending the addressing information of the second end-user to the second gateway;

receiving data packets on the first communications session, processing the packets, and sending the packets on the second communications session; and receiving data packets on the second communications session, processing the packets, and sending the packets on the first communications session.

54. The method of claim 53 wherein processing comprises any or all of data compression, data decompression, encryption, decryption, prioritization and billing.

55. The method of claim 49 wherein a second protocol translator on the second gateway receives packets via the second communications session and sends the packets on the third communications session.

56. The method of claim 55, further comprises the steps of:

on the second communications session, receiving, at the protocol translator, the original addressing information of the second end-user;

opening a new socket to a new TCP port for communicating with the second end-user;

setting up a third communications session with second end-user;

receiving data packets on the second communications session, processing the packets, and sending the packets on the third communications session; and receiving data packets on the third communications session, processing the packets, and sending the packets on the second communications session.

57. The method of claim 56 wherein processing comprises any or all of data compression, data decompression, encryption, decryption, prioritization and billing.

58. The method of claim 49 wherein the second session uses a reliable, connection-oriented link layer.

59. The method of claim 58, further comprising, at the link layer:

fragmenting an original packet into smaller packets;

sending the smaller packets on the second session; and recomposing the smaller packets into the original packet.

60. The method of claim 58, further comprising, at the link layer, using an automatic repeat request (ARQ) algorithm to maintain reliability.

61. The method of claim 60 wherein the ARQ algorithm is such that the ARQ sender conveys its entire receive buffer state to the ARQ receiver.

62. The method of claim 60 wherein the ARQ algorithm determines whether to send an ARQ message based on sequence numbers of messages received.

63. The method of claim 60 wherein the ARQ algorithm determines whether to send an ARQ message based on a period of time.

64. The method of claim 58 wherein the link layer maintains one receive buffer for all sessions between the first gateway and the second gateway.

65. The method of claim 49 wherein forward and return paths of the second communications session use different physical networks and/or physical media.

66. The method of claim 49 wherein an end-user and its associated gateway are the same computer.

* * * * *